(12) United States Patent
Fujii

(10) Patent No.: US 6,912,375 B2
(45) Date of Patent: Jun. 28, 2005

(54) RADIO COMMUNICATING APPARATUS

(75) Inventor: Kenichi Fujii, Yokohama (JP)

(73) Assignee: Canon Kabushiki Kaisha, Tokyo (JP)

(*) Notice: Subject to any disclaimer, the term of this patent is extended or adjusted under 35 U.S.C. 154(b) by 110 days.

(21) Appl. No.: 08/660,920

(22) Filed: Jun. 10, 1996

(65) Prior Publication Data

US 2002/0193077 A1 Dec. 19, 2002

(30) Foreign Application Priority Data

| Jun. 13, 1995 | (JP) | ............................................. 7-170226 |
| Jul. 27, 1995 | (JP) | ............................................. 7-211054 |
| Jul. 31, 1995 | (JP) | ............................................. 7-195006 |

(51) Int. Cl.[7] .............................................. H04B 17/00
(52) U.S. Cl. ................................... 455/67.7; 455/67.11
(58) Field of Search ............................ 455/38.4, 67.11, 455/67.7, 88, 515, 517, 528, 566, 226.1, 226.2, 226.4, 69

(56) References Cited

U.S. PATENT DOCUMENTS

| 4,291,411 A | * | 9/1981 | Muller et al. .................. 455/88 |
| 4,415,770 A | * | 11/1983 | Kai et al. ................. 379/32.01 |
| 4,768,218 A | * | 8/1988 | Yorita ......................... 455/463 |
| 4,882,766 A | * | 11/1989 | Akaiwa ....................... 455/512 |
| 4,937,852 A | * | 6/1990 | Manzarek .................. 455/74.1 |
| 4,958,359 A | | 9/1990 | Kato |
| 4,965,849 A | | 10/1990 | Kunihiro ..................... 455/34 |
| 5,023,900 A | * | 6/1991 | Tayloe et al. ............ 379/32.01 |
| 5,134,708 A | * | 7/1992 | Marui et al. ................. 455/421 |
| 5,218,628 A | * | 6/1993 | Ito .............................. 455/462 |
| 5,339,353 A | * | 8/1994 | Asahara et al. ............. 455/410 |
| 5,426,666 A | | 6/1995 | Kato |
| 5,428,669 A | * | 6/1995 | McCarthy ................... 455/464 |
| 5,471,650 A | * | 11/1995 | Vexler et al. .................. 455/69 |
| 5,493,605 A | | 2/1996 | Akiyama et al. ............. 379/61 |
| 5,530,914 A | * | 6/1996 | McPheters ................... 455/518 |
| 5,559,861 A | * | 9/1996 | Takehisa ..................... 455/462 |
| 5,640,684 A | * | 6/1997 | Konosu et al. ............ 455/67.7 |
| 5,724,647 A | * | 3/1998 | Sato ........................ 455/552.1 |

FOREIGN PATENT DOCUMENTS

| JP | 62-17254 | 2/1987 |
| JP | 63-48926 | 3/1988 |
| JP | 2-39738 | 2/1990 |
| JP | 292121 | 3/1990 |
| JP | 6-112889 | 4/1994 |
| JP | 6-152508 | 5/1994 |
| JP | 6-334583 | 12/1994 |
| JP | 7-095148 | 4/1995 |
| JP | 7110350 | 4/1995 |
| JP | 7-131399 | 5/1995 |

OTHER PUBLICATIONS

Japanese Office Action dated Mar. 16, 2004, issued in the corresponding Japanese application No. 7–211054 and English translation of the Office Action.
Japanese Office Action dated Sep. 10, 2002, issued in the corresponding Japanese application No. 7–195006 and English translation of the Office Action.

* cited by examiner

Primary Examiner—Charles N. Appiah
(74) Attorney, Agent, or Firm—Morgan & Finnegan, LLP

(57) ABSTRACT

A first radio communicating apparatus which is connected to a second radio communicating apparatus through a radio line is constructed by a reception unit for receiving a state signal indicative of a receiving state of the second radio communicating unit and a display for displaying in accordance with the state signal such as a radio signal received by the reception unit. The reception unit has a connection device for connecting the second radio communicating apparatus via a cable.

15 Claims, 26 Drawing Sheets

| 46ch    X |

| #1   OOOOXOOX |

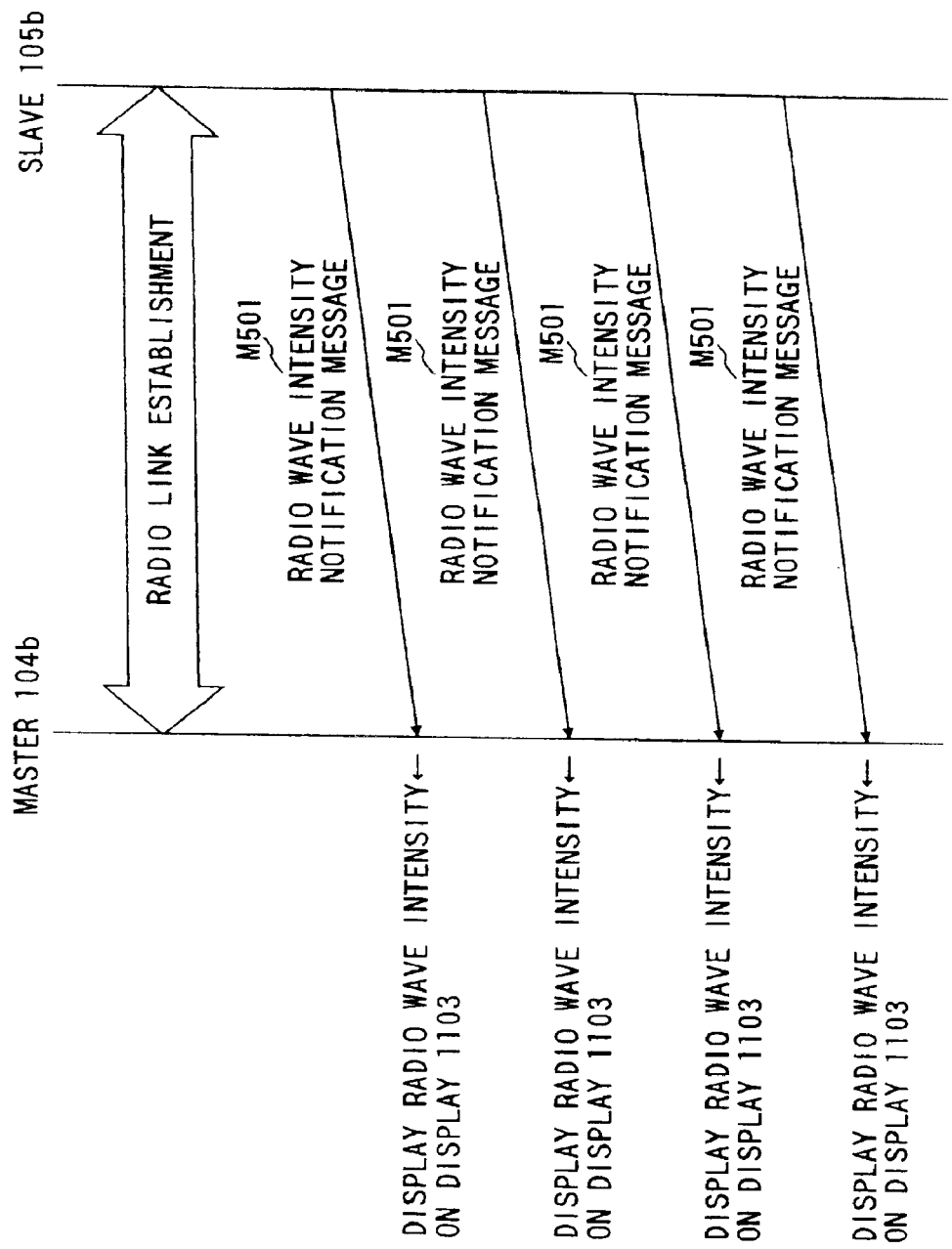

RADIO COMMUNICATING APPARATUS

BACKGROUND OF THE INVENTION

1. Field of the Invention

The invention relates to a radio communicating apparatus having a function to detect a receiving state.

2. Related Background Art

In a radio communicating apparatus such as a business cordless telephone or the like, since channels other than the channel that is actually used are broken by noises which are generated from peripheral apparatuses, it is necessary to measure a radio wave environment in order to guarantee the stable operation. As a measurement of the radio environment performed there, it is a main way to measure an intensity of a radio wave of a radio channel by a radio wave measuring instrument and to judge the presence or absence of the radio wave.

In such a measuring instrument, since a threshold value for the judgment about the presence or absence of the radio wave, the sampling number per unit time, and the like cannot be set in detail, the judgment result is the absolute value.

FIG. 29 shows display contents in the case where the measurement was performed by a radio wave measuring instrument in the conventional apparatus.

Even if the radio wave environment of a location where the apparatus is installed is measured by the radio wave measuring instrument, there is actually a difference of radio wave characteristics between the measuring instrument and the apparatus. For example, as a factor of such a difference, there is a sensitivity or a matching performance of an antenna which is used, an influence by noises which the apparatus itself has, or the like. The true radio wave environment cannot be measured by the radio wave measuring instrument.

In the radio communicating apparatus such as a cordless telephone apparatus having a master and slaves for performing a radio communication with the master or the like, there is an apparatus such that the slave has a display for displaying an intensity of a radio wave that is received from the master during the speech communication.

Examples of a display of the intensity of the radio wave that is received from the master by the display of the slave will now be described with reference to FIGS. 30A to 30C. FIGS. 30A to 30C are diagrams showing display examples of the intensity of the radio wave that is received from the master by the display provided for the slave of the telephone apparatus.

As shown in FIGS. 30A to 30C, the display provided for the slave mentioned above is set so as to separately display the intensity of the radio wave that is received from the master by three stages. The intensity of the radio wave at each stage is shown by the number of marks "(" and it is shown that the radio wave becomes strong with an increase in number of marks. A black painted circle on a display screen indicates the master and a mark of the antenna shows the slave.

For example, when the slave receives the radio wave which is transmitted from the master and in which a degree of intensity is strong, as shown in FIG. 30A, two marks "(" are displayed on the display. When the slave receives the radio wave in which a degree of intensity is middle from the master, as shown in FIG. 30B, one mark "(" is displayed on the display. When the slave receives the radio wave in which a degree of intensity is weak from the master, as shown in FIG. 30C, the mark "(" is not displayed on the display.

However, by displaying the degree of intensity of the radio wave that is received from the master onto the display of the slave by the slave, although the degree of intensity of the radio wave that is received from the master can be informed to the user of the slave, a degree of intensity of the radio wave that is received by the master from the slave cannot be notified to the user of the slave. Therefore, there is a situation such that although the intensity of the radio wave that is transmitted from the master to the slave is enough, the user moves to a location where the intensity of radio wave from the slave to the master obstructs a speech communication without knowing such a fact. There is, consequently, a case where the speech communication from the slave to the master is interrupted due to the movement of the slave to such a position.

SUMMARY OF THE INVENTION

It is an object of the invention to improve the reliability of a radio communication.

Another object of the invention is to display a receiving state of a partner side of a radio communication.

Still another object of the invention is to improve a procedure when a radio communicating apparatus is installed.

Further another object of the invention is to make it possible to accurately know whether a radio channel is free or busy.

Further another object of the invention is to make it possible to accurately know a fact that a receiving state of a partner side of a radio communication deteriorated during a speech communication.

Further another object of the invention is to reduce noises by a control signal for displaying a receiving state during a speech communication.

Further another object of the invention is to enable a radio channel to be efficiently used.

Further another object of the invention is to improve a construction of a display of a receiving state.

The above and other objects and features of the present invention will become apparent from the following detailed description and the appended claims with reference to the accompanying drawings.

BRIEF DESCRIPTION OF THE DRAWINGS

FIG. 25 is a diagram showing a sequence between a master and a slave of the radio communicating apparatus;

DETAILED DESCRIPTION OF THE PREFERRED EMBODIMENTS

Figure 1:
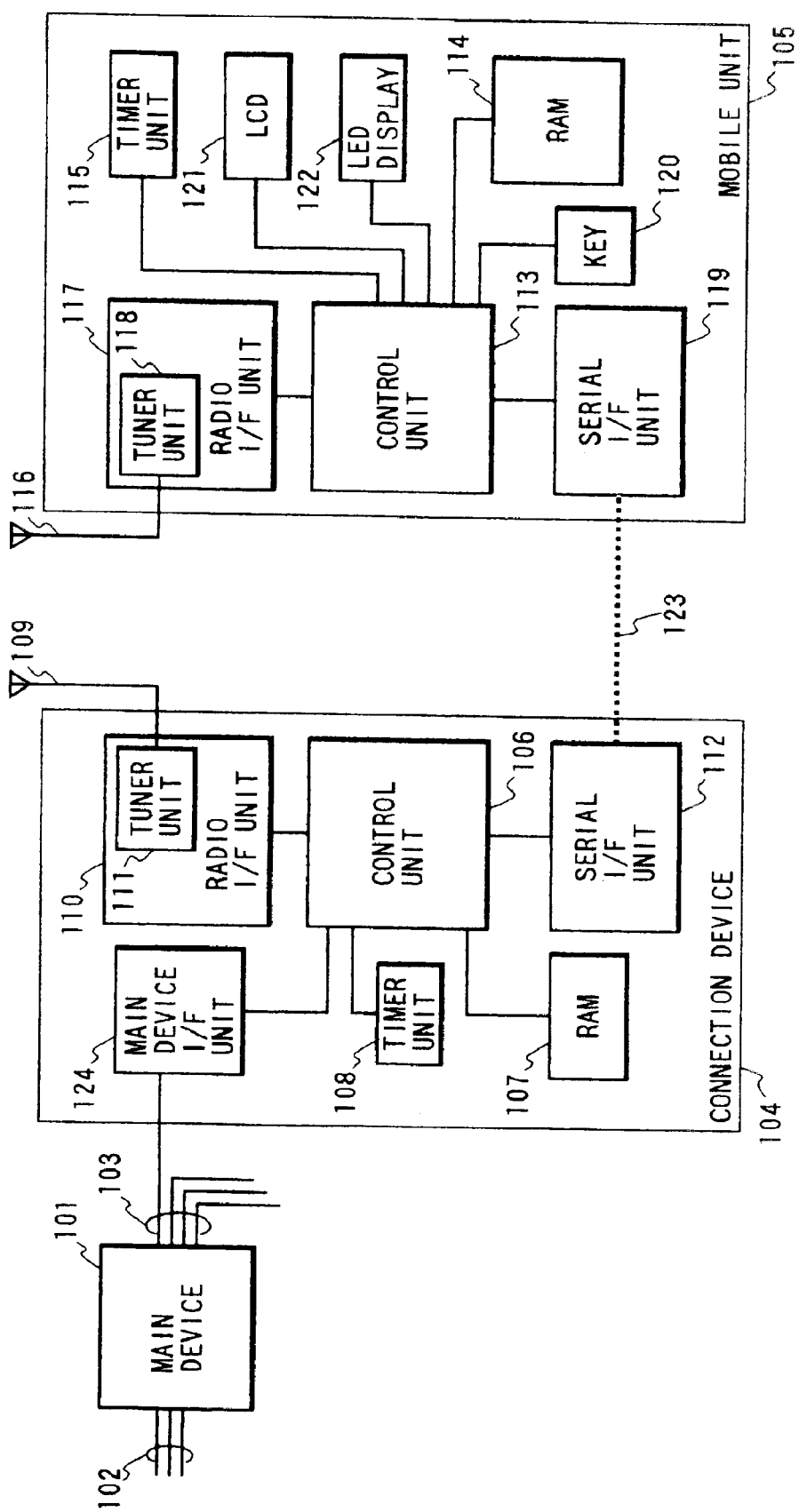
FIG. 1 is a block diagram of a radio communicating apparatus embodying the invention.

FIG. 1 is a block diagram of a radio communicating apparatus embodying the invention.

Reference numeral 101 denotes a main device of the radio communicating apparatus. The main device 101 has an exchanging function. Reference numeral 102 denotes an external line; 103 an extension; 104 a connection device which is enclosed in the extension 103 of the main device 101 and executes a radio communication with a mobile unit 105; and 124 a main device interface unit for allowing the main device 101 and connection device 104 to perform a communication. The connection device 104 can be also connected to the external line 102 without intervening the main device 101.

Reference numeral 106 denotes a control unit for controlling the connection device 104; 107 an RAM serving as a memory medium of the connection device 105; 108 a timer unit; 109 an antenna; 110 a radio interface unit for controlling a radio communication with the mobile unit 105 through the antenna 109; 111 a tuner unit; and 112 a serial interface unit.

Reference numeral 105 denotes the mobile unit for performing a radio communication with the connection device 104; 113 a control unit for controlling the mobile unit 105; 114 an RAM serving as a memory medium of the mobile unit 105; 115 a timer unit; 116 an antenna; 117 a radio interface unit for controlling the radio communication with the connection device 104 through the antenna 116; 118 a tuner unit; 119 a serial interface unit; 120 a key button for inputting a key; 121 a liquid-crystal display (LCD); 122 an LED display; and 123 a serial cable for physically connecting the connection device 104 and mobile unit 105. The mobile unit 105 also has a handset or the like for a speech communication. The serial cable 123 is used when a service person measures a radio wave environment, which will be explained hereinlater, by connecting the connection device 104 and mobile unit 105 at the time of an installation of the apparatus. ID data or the like can be also registered through the serial cable 123 upon installation.

Figure 2:
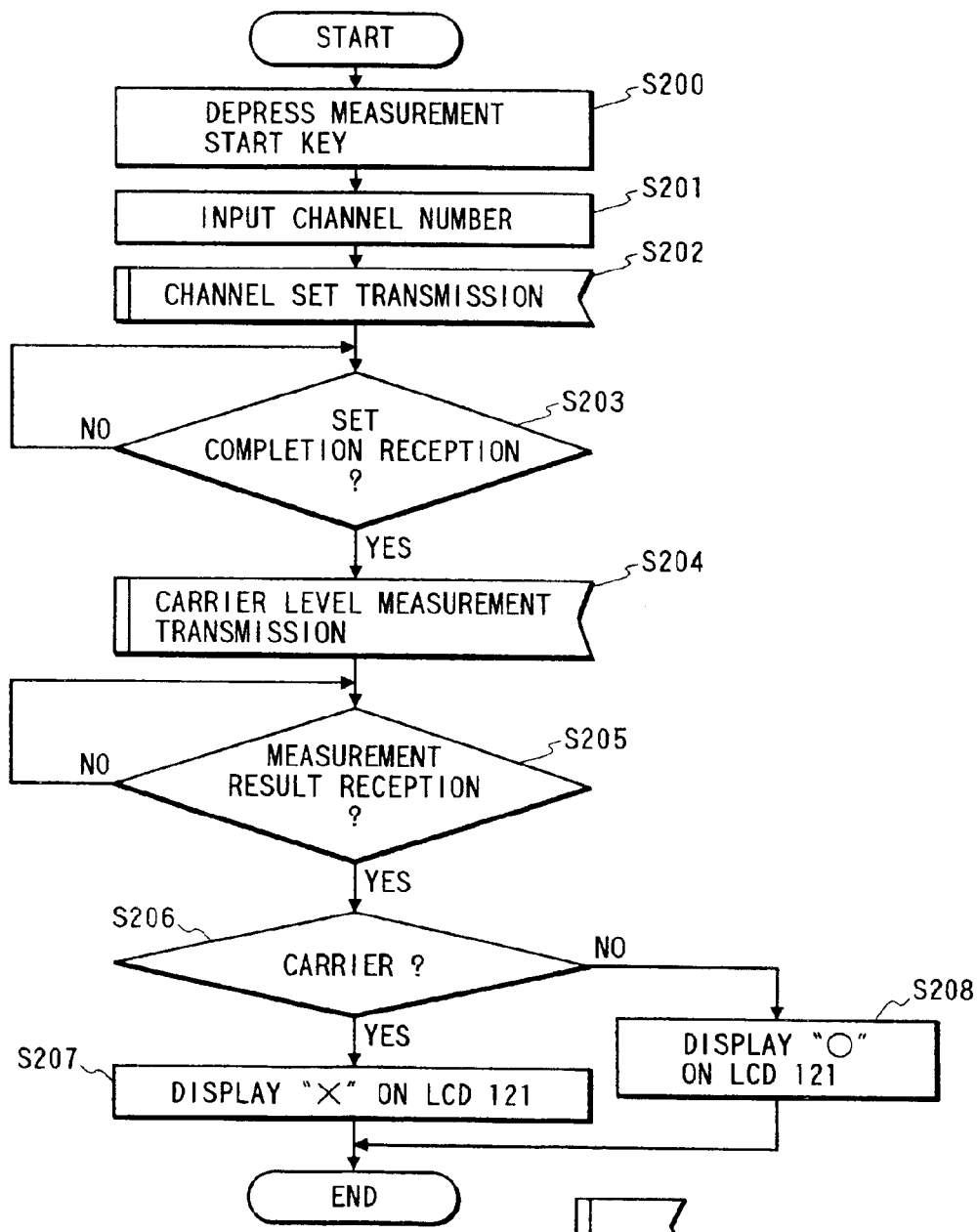
FIG. 2 shows a first example of a flowchart for a mobile unit.

FIG. 2 is a flowchart showing the first example of a control of the control unit 113 of the mobile unit 105 in the case where a measurement is instructed to the control unit 106 of the connection device 104 through the serial I/F unit 112 of the connection device 104 from the serial I/F unit 119 of the mobile unit 105 via the serial cable 123 and a measurement result is displayed to the LCD 121 of the mobile unit 105.

In the case where the user wants to measure a carrier level of a specific channel (for example, a channel 46), when the key 120 to promote the start of the measurement of the radio channel of the connection device 104 is depressed (step S200), the control unit 113 of the mobile unit 105 promotes the user to input the channel, so that the user inputs the channel by the key 120 (S201) (in this case, the channel 46). The inputted channel is notified to the serial I/F unit 112 of the connection device 104 from the serial I/F unit 119 of the mobile unit 105 via the serial cable 123 (S202). Subsequently, the apparatus waits until a channel set completion that is transmitted from the control unit 106 of the connection device 104 is received (S203). When the channel set completion signal is received, an instruction to measure the carrier level is transmitted from the serial I/F unit 119 to the connection device 104 (S204). When the result measured by the connection device 104 is received by the serial I/F unit 119 (S205), the presence or absence of the carrier is examined from the measured result (S206). When there is the carrier, "x" is displayed on the LCD 121 (S207). When there is no carrier, "◯" is displayed on the LCD 121 (S208).

Figure 3:
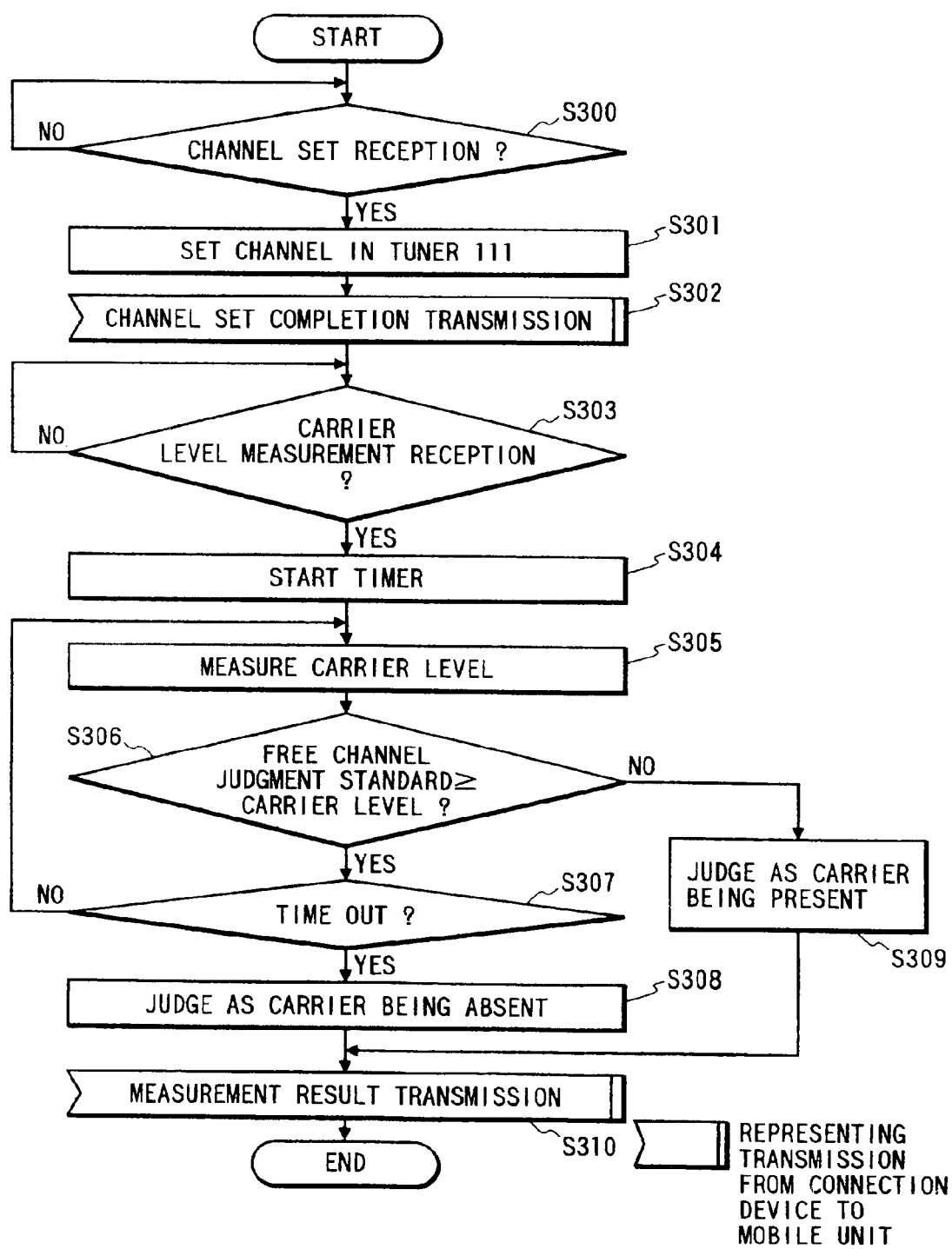
FIG. 3 shows a first example of a flowchart for a connection device.

FIG. 3 is a flowchart showing a control of the control unit 106 of the connection device 104 in the case where the carrier level of the radio channel was measured by the instruction shown in FIG. 2 from the mobile unit 105.

When the channel set is received by an instruction from the mobile unit 105 (S300), the instructed channel is set into the tuner unit 111 (S301). After completion of the setting, the channel set completion is transmitted to the mobile unit 105 (S302). The apparatus subsequently waits for the reception of an instruction to measure the carrier level from the mobile unit 105 (S303). When the instruction to measure the carrier level is received by the serial I/F unit 112, the measurement of the carrier level is performed four times at an interval of 100 msec by using the tuner unit 111 (S304, S305, S307).

The time interval of 100 msec and four times are the same time interval and the number of times of the measurement as those in the judgment regarding whether the channel which is used is free before the transmission of the radio signal or not. The value indicative of the measurement result is compared with a judgment reference level about the free channel (S306). When the measured values at four measuring times are equal to or smaller than the judgment reference level of the free channel, it is judged that there is no carrier (S308). When the measured value of at least one time exceeds the judgment reference level, it is judged that the carrier exists (S309). The judgment reference level of the free channel in step S306 has previously been stored in the RAM 107. The judgment reference level is set to the same value as that in the judgment regarding whether the channel that is used is free before the transmission of the radio signal or not. The measured results are transmitted from the serial I/F unit 112 to the mobile unit 105 (S310).

Figures 7, 8, 9:
FIG. 7 is a diagram showing a first example of a display of an LCD.
FIG. 8 is a diagram showing a second example of a display of the LCD.
FIG. 9 is a diagram showing a third example of a display of the LCD.

FIG. 7 shows an example of a case where the carrier level measured by the radio I/F unit 110 of the connection device 104 is compared with the judgment reference level of the free channel and the comparison result is displayed as a binary value by the LCD 121 of the mobile unit 105 in step S207.

In the embodiment of FIGS. 2 and 3, whether the radio channel to be used in the radio communicating apparatus is free or not is judged in accordance with the judgment reference of the free channel used in the radio communicating apparatus. Therefore, a proper judgment can be made more accurately than the conventional measuring instrument. By using the operating function (for example, key input unit or the like) or the display (LCD or LED) of the mobile unit, the operating function and display don't need to be provided for the connection device 104. Further, there is an advantage such that by expressing the judgment result by a binary value, the user can easily know whether the use of the radio channel is permitted or inhibited.

In addition to the visual display using the displays 121 and 122, the judgment result can be also informed by a sound by using a speaker (not shown).

Figure 4:
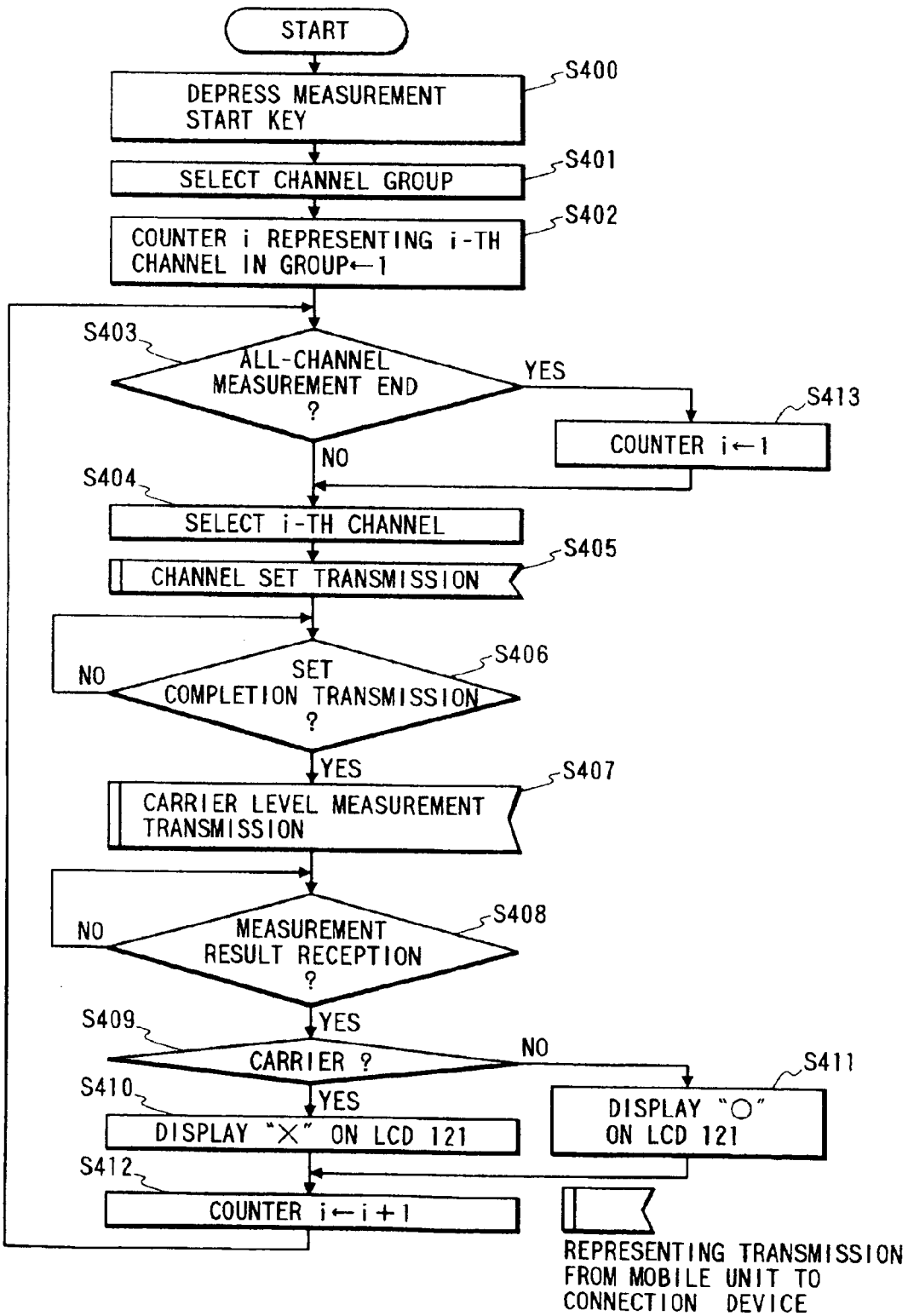
FIG. 4 shows a second example of a flowchart for a mobile unit.

FIG. 4 is a flowchart showing the second example of a control of the control unit 113 of the mobile unit 105 in the case where the measurement is instructed to the control unit 113 of the connection device 104 through the serial I/F unit 112 of the connection device 104 from the serial I/F unit 119 of the mobile unit 105 via the serial cable 123 and the measured result is displayed to the LCD 121 of the mobile unit 105.

First, in the mobile unit 105, the control unit 113 previously has a group of radio channels which are used by the radio communicating apparatus. For example, it is assumed that the group 1 is set to {3, 12, 21, 37, 46, 63, 70, 89} and the group 2 is set to {4, 7, 34, 46, 60, 67, 83, 89}. The group has been selected to avoid an intermodulation. So long as a plurality of connection devices and mobile units connected to the main device 101 use the channels in the same group, the channels in the same group are not influenced by the intermodulation. Channels 46 and 89 are control channels. In the case where the user wants to measure the carrier level of the group of the radio channels, the key 120 to promote the start of the measurement of the radio channel of the connection device 104 is depressed (S400). The group to which the user wants to measure is instructed from the key button 120 of the mobile unit 105 (S401). The control unit 113 sequentially selects the channels in the group (S402, S403, S404). The channel set of the selected channels is transmitted from the serial I/F unit 119 to the connection device 104 (S405). The apparatus waits until the channel set completion which is transmitted from the connection device 104 is received (S406). When the channel set completion is received, the measured value of the carrier level is transmitted to the connection device 104 (S407). The apparatus waits until the measured result of the carrier level that is transmitted from the connection device 104 is received (S408). When the result measured by the connection device 104 is received by the serial I/F unit 119, the presence or absence of the carrier is judged from the measured result (S409). When there is the carrier, "x" is displayed on the LCD 121 (S410). When there is no carrier, "O" is displayed on the LCD 121 (S411). Subsequently, a preparation to select the next channel is performed (S412). The above processes are repetitively executed.

In step S403, when the measurements of all of the channels in the group are finished, a counter i is reset (S413). The measurement of each channel in the group is repeated. The measurement is repeated until a key to promote the end of the measurement of the radio channel of the connection device 104 is depressed.

A flowchart showing a control of the control unit 106 of the connection device 104 in the case where the measurement of the carrier level of the radio channel is performed by the instruction (shown in FIG. 4) from the mobile unit 105 is common to that in FIG. 3.

FIG. 8 shows an example in the case where the carrier levels measured by the radio I/F unit 110 of the connection device 104 with respect to the eight radio channels of the group 1 are compared with the judgment reference level of the free channel and the comparison results are displayed on the LCD 121 of the mobile unit 105 by a binary value in steps S410 and S411. In the form of the embodiment, since the measurement of the channels in the group is repetitively executed, when the radio wave environment is changed, the display contents of the display 121 also change. FIG. 8 shows the state indicating that no carrier is detected in the channels 3, 12, 21, 37, 63, and 70 but the carriers were detected in the channels 46 and 89.

In the embodiment of FIGS. 3 and 4, whether the radio channel to be used in the radio communicating apparatus is free or not is judged in accordance with the judgment reference level of the free channel used in the radio communicating apparatus. Therefore, it is possible to judge more accurately than the conventional measuring instrument. By using the operating function (for example, key input unit or the like) and display (LCD or LED) of the mobile unit, there is no need to provide the operating function and display for the connection device 104. Further, the measurement is performed by limiting to the radio channel that is used in the radio communicating apparatus. There is, consequently, an advantage such that a larger number of samples than that in case of measuring all of the radio channels can be obtained.

Among the groups measured as mentioned above, it is sufficient to select the group with a good situation and to execute the radio communication.

It is also possible to construct in a manner such that the control units 106 and 113 measure the channels of each group and select the group in which all of the channels are free or the group in which the number of free channels is relatively large.

Figure 5:
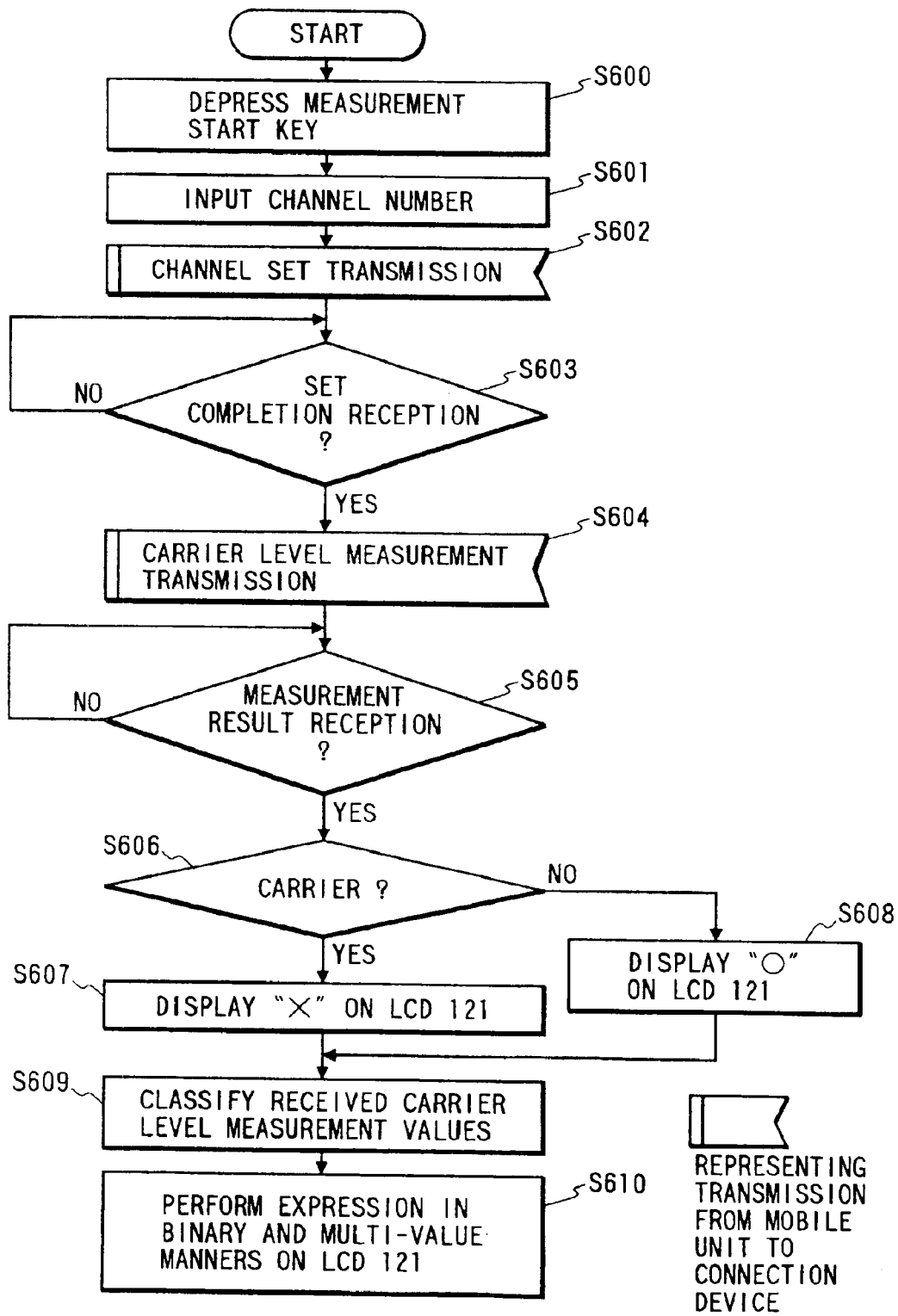
FIG. 5 shows a third example of a flowchart for a mobile unit.

FIG. 5 is a flowchart showing the third example of the control of the control unit 113 of the mobile unit 105 in the case where the carrier level measured by the connection device 104 is compared with the judgment reference level of the free channel, the comparison result is expressed by a multi-value, and the resultant multi-value is notified from the serial I/F unit 112 of the connection device 104 to the serial I/F unit 119 of the mobile unit 105 via the serial cable 123, and the result is displayed to the LCD 121 of the mobile unit 105.

In the case where the user wants to measure the carrier level of a specific channel (for example, channel 70), the control unit 113 of the mobile unit 105 promotes the input of the channel when the key 120 to promote the start of the measurement of the radio channel of the connection device 104 (S600). The user, therefore, inputs the channel by the key 120 (S601) (in this case, channel 70). The inputted channel is notified from the serial I/F unit 119 of the mobile unit 105 to the serial I/F unit 112 of the connection device 104 via the serial cable 123 (S602). Subsequently, the apparatus waits until the channel set completion that is transmitted from the control unit 106 of the connection device 104 is received (S603). When the apparatus receives the channel set completion, the measured value of the carrier level is transmitted to the connection device 104 (S604). When the result measured by the connection device 104 is received by the serial I/F unit 119 (S605), the presence or absence of the carrier is examined from the measurement result (S606). When there is the carrier, "x" is displayed by the LCD 121 (S607). When there is no carrier, "○" is displayed on the LCD 121 (S608). Subsequently, the measured value of the carrier level which was received is compared with the judgment reference level of the free channel and the comparison result is classified into the corresponding stage (S609). The multi-value indicative of the comparison result is also displayed by the LCD 121 (S610).

Figure 6:
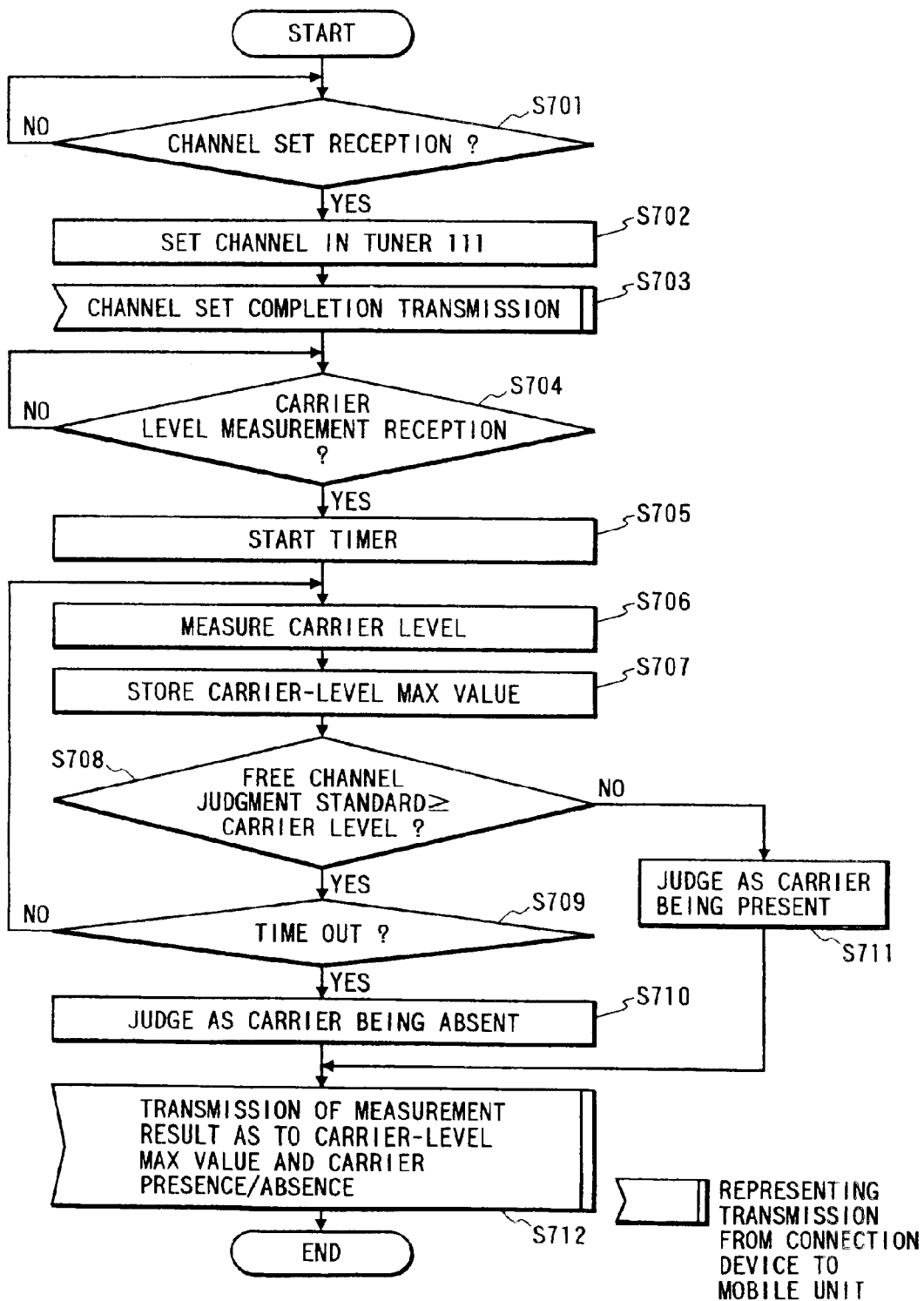
FIG. 6 shows a second example of a flowchart for a connection device.

FIG. 6 is a flowchart showing a control of the control unit 106 of the connection device 104 in the case where the carrier level of the radio channel was measured by the instruction shown in FIG. 5 from the mobile unit 105.

When the apparatus receives the channel set by the instruction from the mobile unit 105 (S701), the instructed channel is set into the tuner unit 111 (S702). When the setting is finished, the channel set completion is transmitted to the mobile unit 105 (S703). Subsequently, the apparatus waits until the instruction to measure the carrier level is received from the mobile unit 105 (S704). When the apparatus receives the instruction to measure the carrier level, the carrier level is measured at a time interval of 100 msec four times (S705, S706, S709). The measured value is compared with the judgment reference level of the free channel (S708). When the measured values of four times are equal to or smaller than the judgment reference value of the free channel, it is judged that there is no carrier (S710). When the measured value of at least one time exceeds the judgment reference level, it is judged that there is a carrier (S711). In this instance, the maximum value of the carrier level is also preserved every measurement (S707). The measurement result is transmitted to the mobile unit 105 from the serial I/F unit 112 (S712).

FIG. 9 is a diagram showing an example in the case where the carrier level measured by the radio I/F unit 110 of the connection device 104 in FIGS. 5 and 6 is compared with the judgment reference level of the free channel and the comparison result is classified into a stage and is displayed by a multi-value in step S610 by the LCD 121 of the mobile unit 105.

In the embodiments of FIGS. 5 and 6, whether the radio channel to be used in the radio communicating apparatus is free or not is judged in accordance with the judgment reference level of the free channel used in the radio communicating apparatus and the judgment result is classified into a stage. Thus, even if it is judged that the radio channel is free, a degree of free channel can be known in detail, so that the installing location of the radio communicating apparatus can be selected. By using the operating function (for example, key input unit or the like) and display (LCD or LED) of the mobile unit 105, there is an advantage such that there is no need to provide the operating function and display for the connection device 114.

Figure 10:
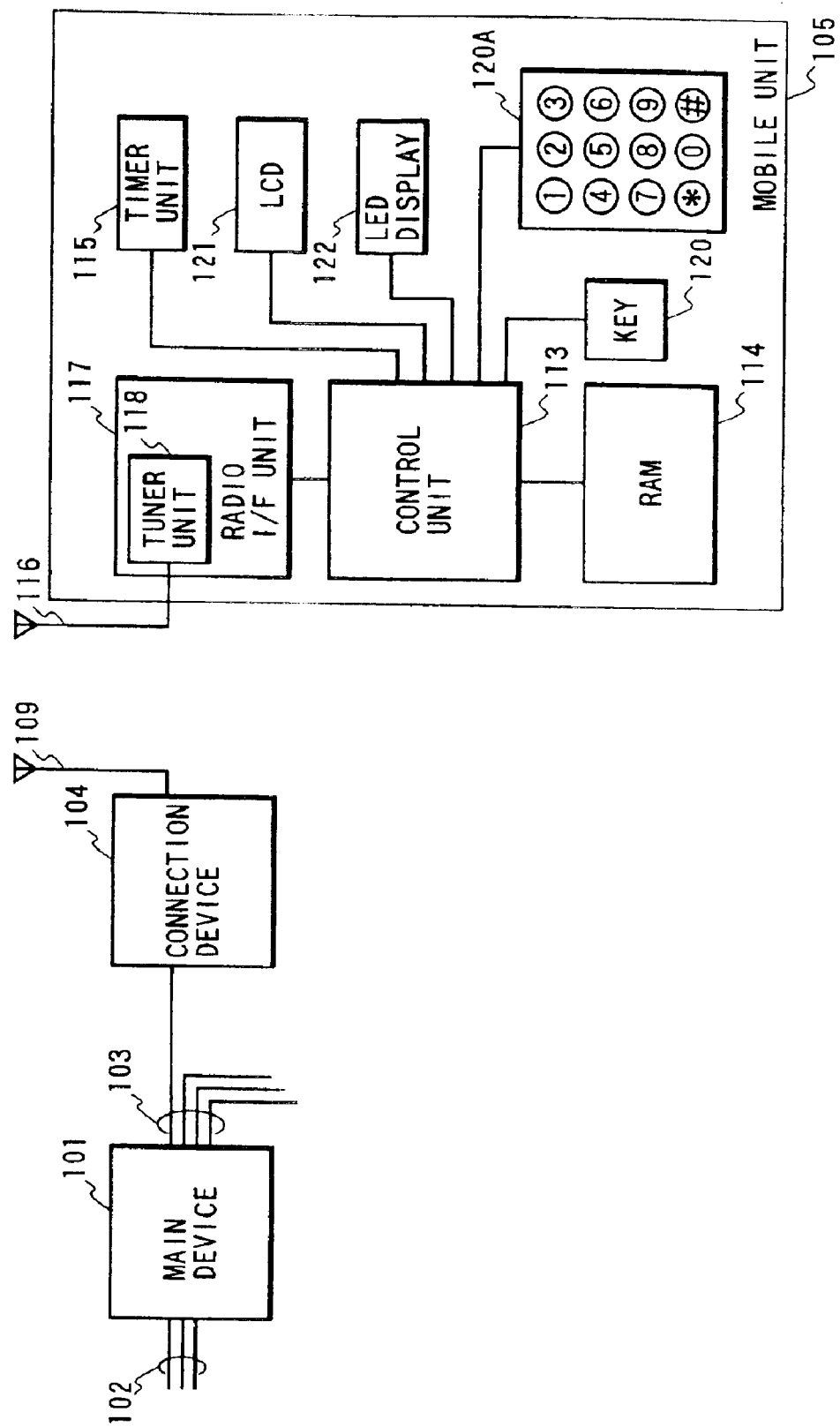
FIG. 10 is a block diagram of a radio communicating apparatus embodying the invention.

The measurement of the radio wave environment on the connection device 104 has been described above. The measurement of the radio wave environment on the mobile unit 105 side will now be described. It is a frequency band of a down signal that is measured by the connection device 104. It is a frequency band of an up signal that is measured by the mobile unit 105. In case of measuring by the mobile unit 105, the serial cable is unnecessary as shown in FIG. 10.

Figure 11:
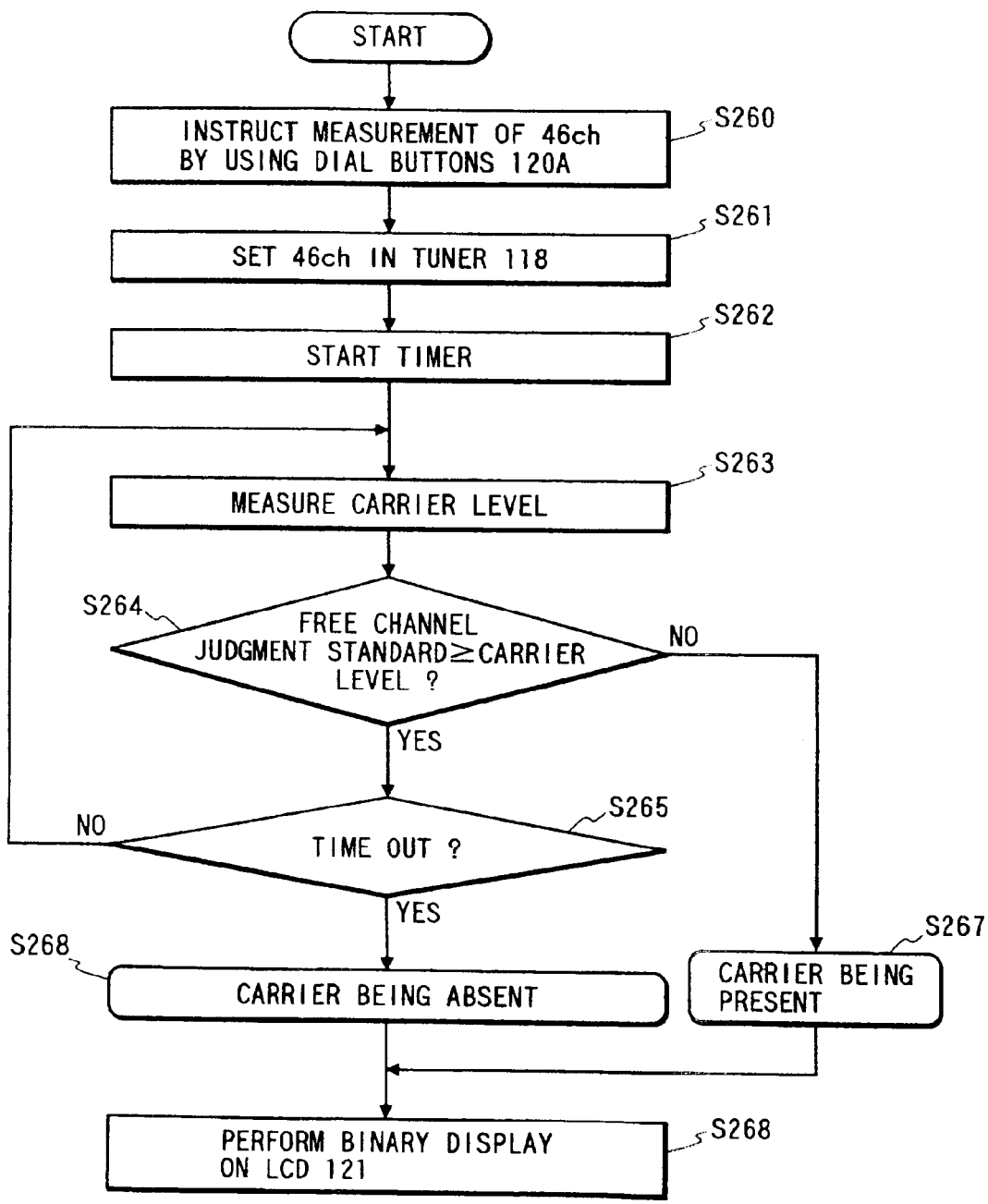
FIG. 11 shows a first example of a flowchart of a mobile unit.

FIG. 11 is a flowchart showing the first example of the control of the control unit 113 in the case where the carrier level at which the measurement was performed by the mobile unit 105 is compared with the judgment reference level of the free channel and the comparison result is expressed by a binary value.

First, in the case where the user wants to measure the carrier level of a specific channel (for example, channel 46), the control unit 113 of the mobile unit 105 inputs the channel by using a dial button 120A (S260). The inputted channel is set into the tuner unit 118 (S261). The measurement of the carrier level is performed four times at a time interval of 100 msec (S262, S263, S265). The measured values are compared with the judgment reference level of the free channel (S264). When the measured values of four times are equal to or smaller than the judgment reference level of the free channel, it is judged that there is no carrier (S266). When the measured value of at least one time exceeds the judgment reference level, it is judged that there is the carrier (S267). From this result, the presence or absence of the carrier is displayed by a binary value to the LCD 113 (S268).

A construction such that the carrier level measured by the radio I/F unit 117 of the mobile unit is compared with the judgment reference level of the free channel and the comparison result is displayed by the binary value to the LCD 121 is common to that of FIG. 7. However, since the radio wave environment in the up frequency band differs from that in the down frequency band, the contents which are actually displayed also differ.

Since whether the radio channel to be used in the radio communicating apparatus is free or not is judged by the control of FIG. 11 on the basis of the judgment reference level of the free channel used in the radio communicating apparatus, the judgment can be made more accurately than the case of the conventional measuring instrument. Since the comparison result is expressed by the binary value, there is an advantage such that whether the use of the radio channel is permitted or inhibited can be easily known.

Figure 12:
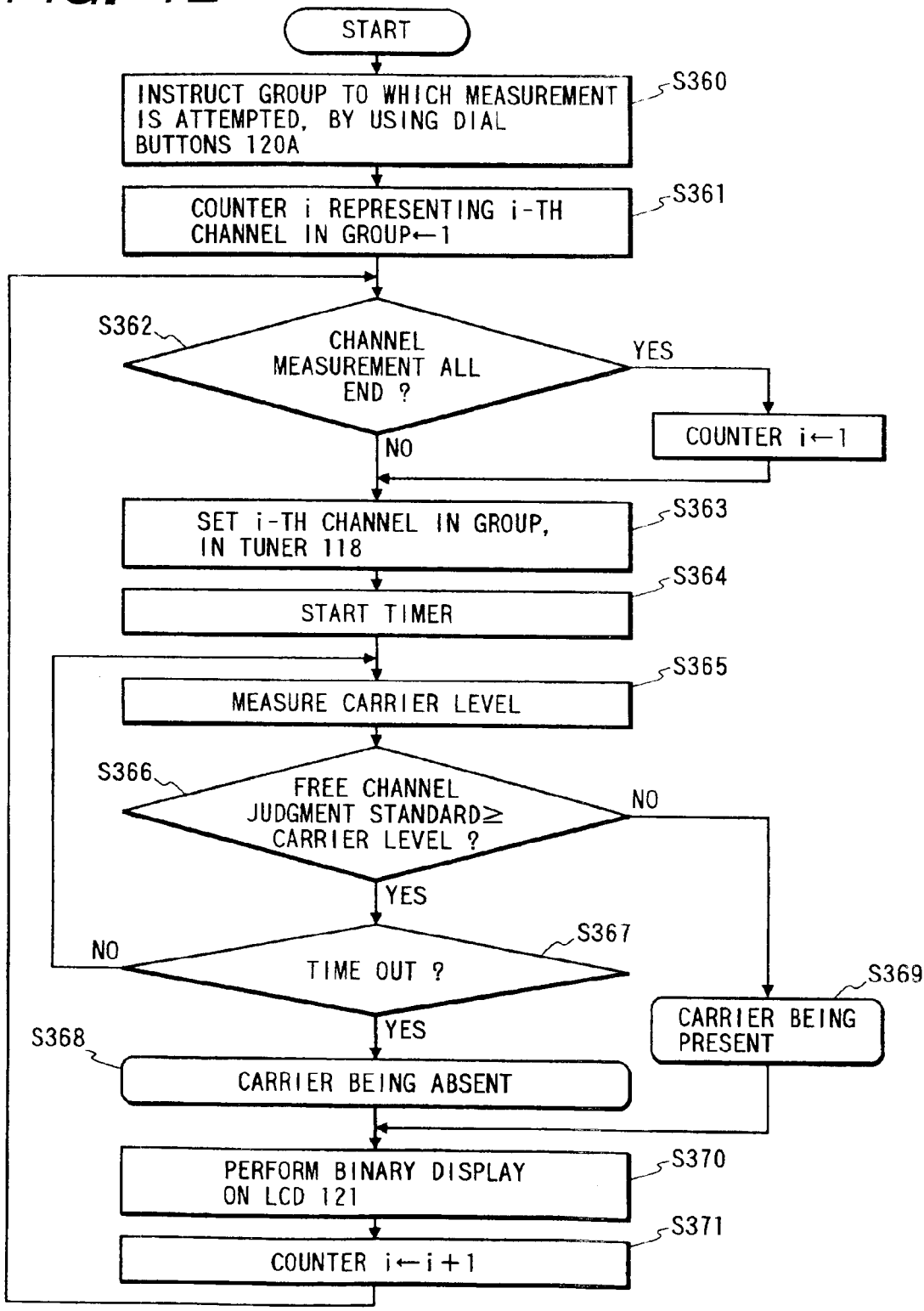
FIG. 12 shows a second example of a flowchart of the mobile unit.

FIG. 12 is a flowchart showing the second example of the control of the control unit 113 in the case where the carrier level measured by the mobile unit 105 is compared with the judgment reference level of the free channel and the comparison result is expressed by the binary value.

First, in the mobile unit 105, the group of radio channels which are used in the radio communicating apparatuses are previously provided for the control unit 113. For example, the group 1 is set to {3, 12, 21, 37, 46, 63, 70, 89} and the group 2 is set to {4, 7, 34, 46, 60, 67, 83, 89}. In the case where the user wants to measure the carrier level of the group of the radio channel, the group to be measured is instructed from the dial button 120A (S360). The channels in the group are sequentially selected (S361, S362, S363). Subsequently, the selected channel is set into the tuner unit 118 (S363). The measurement of the carrier level is executed four times at a time interval of 100 msec (S364, S365, S367). The measured values are compared with the judgment reference level of the free channel (S366). When the measured values of four times are equal to or smaller than the judgment reference level of the free channel, it is judged that there is no carrier (S368). When the measured value of at least one time exceeds the judgment reference level, it is judged that there is the carrier (S369). The result about the presence or absence of the carrier is displayed by the binary value on the LCD 121 (S370). Subsequently, a preparation for selecting another channel of the group of the radio channel is performed (S371). Operations similar to those mentioned above are repeated and the judgment of all of the channels of the group of the radio channel is performed.

A construction in the case where the carrier levels measured by the radio I/F unit 117 of the mobile unit 105 with respect to the eight radio channels of the group 1 are compared with the judgment reference level of the free channel and the comparison result is displayed by the binary value to the LCD 121 is common to that in FIG. 8. However, since the radio wave environment of the up frequency band differs from that of the down frequency band, the contents which are actually displayed differ.

In accordance with the results obtained by the judgment of FIG. 12, when there is the carrier, "x" is displayed and when there is no carrier, "○" is displayed.

Since whether the radio channel to be used in the radio communicating apparatus is free or not is judged by the control of FIG. 12 on the basis of the judgment reference level of the free channel, the judgment can be more accurately performed than the case of the conventional measuring instrument. The measurement is performed by limiting to the radio channel which is used in the radio communicating apparatus. Therefore, there is an advantage such that samples of the number larger than that in case of measuring all of the radio channels can be obtained.

Figure 13:
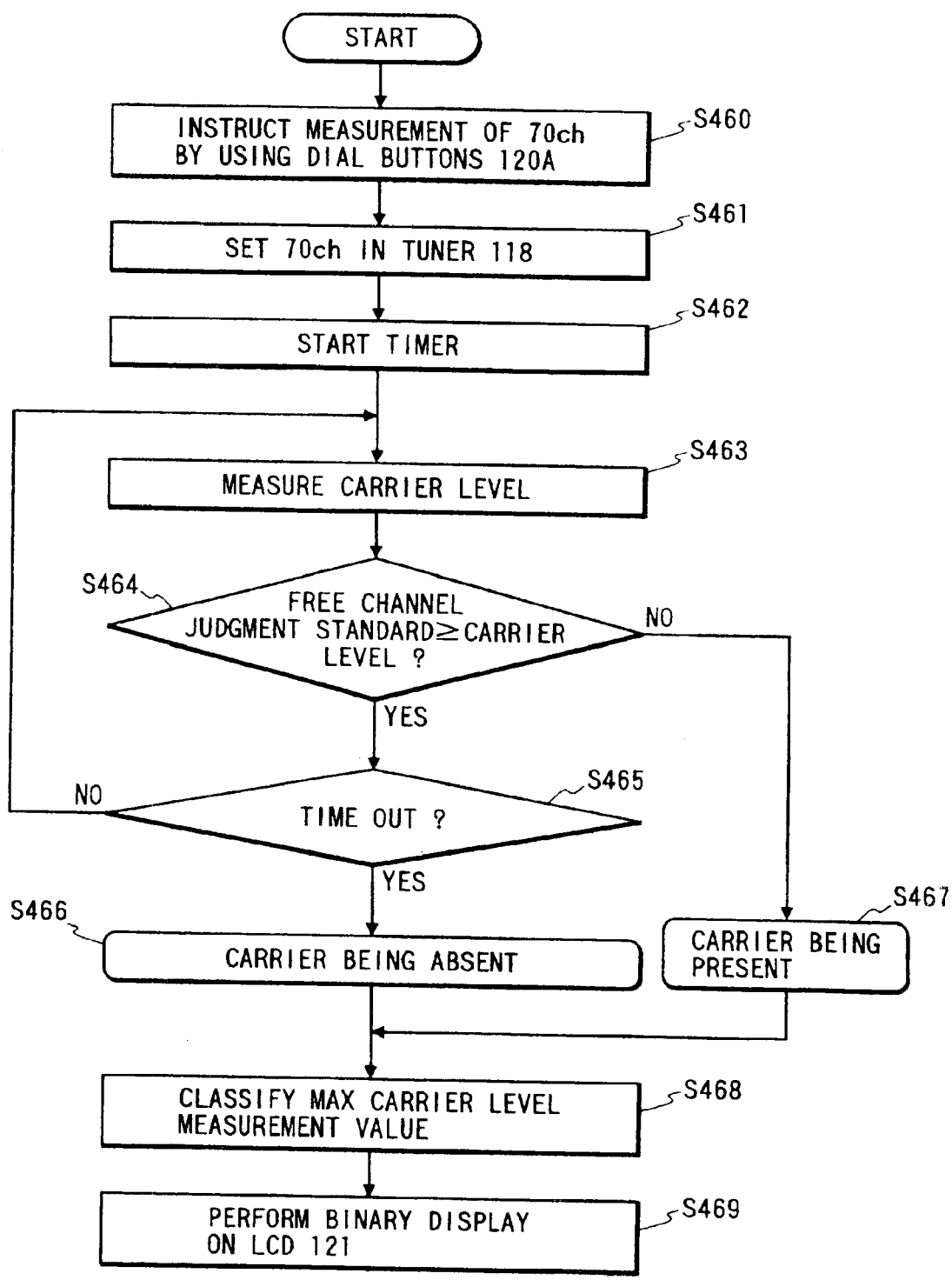
FIG. 13 shows a third example of a flowchart of the mobile unit.

FIG. 13 is a flowchart showing the third example of the control of the control unit 113 in the case where the carrier level measured by the mobile unit 105 is compared with the judgment reference level of the free channel and the comparison result is expressed by the binary value.

First, in the case where the user wants to measure the carrier level of a specific channel (for example, channel 70), the control unit 113 of the mobile unit 105 sets the channel into the tuner unit 118 (S460, S461). The measurement of the carrier level is executed four times at a time interval of 100 msec (S462, S463, S464, S465). The largest one of the measured values is compared with the judgment reference level of the free channel and the comparison result is classified into the stage in accordance with the difference between the values (S468, S469).

When the measured values of four times are smaller than the judgment reference level of the free channel, it is judged that there is no carrier and, when the measured value of at least one time is larger than the judgment reference value, it is judged that there is the carrier (S466, S467).

A construction in the case where the carrier level measured by the radio I/F unit 117 of the mobile unit 105 in the embodiment of FIG. 13 is compared with the judgment reference level of the free channel and the comparison result is classified into the stage and is expressed by the multi-value by the LCD 121 is common to that in FIG. 9. However, since the radio wave environment of the up frequency band differs from that of the down frequency band, the contents which are actually displayed also differ.

Since whether the radio channel to be used in the radio communicating apparatus is free or not is judged by the control of FIG. 13 on the basis of the judgment reference level of the free channel used in the radio communicating apparatus and the judgment result is classified to the stage, even if it is judged that the radio channel is free, a degree of free channel can be known further in detail. There is, consequently, an advantage such that a better installing location of the radio communicating apparatus can be selected.

In the above description, although the result has been displayed by the LCD 121, by displaying to the LED display 122, there is an advantage such that the LCD 121 which can display character information can be effectively used.

In the above description, although the judgment of the free channel has been sampled four times at a time interval of 100 msec, another judging method can be also used.

In FIGS. 5, 6, and 13, the largest one of the four samples of the measured values of the carrier level has been compared with the judgment reference level of the free channel. However, this is because the level in the worst case has been selected as a level for judging the free channel. Even by using the mean value of the four samples, there is an advantage such that the average result of the radio channel can be obtained.

In FIGS. 5, 6, and 13, the results classified to the stages obtained by the judgment of FIGS. 5, 6, and 13 have been shown by bar graphs as shown in FIG. 9. However, a similar effect is also derived by displaying by using numerical values in accordance with the results classified to the stages.

In the embodiment as mentioned above, in case of measuring the carrier on the connection device 104 side, the tuner unit 111 is set to the channel to be measured, the presence or absence of the carrier is judged, and the judgment result is notified to the mobile unit 105 through the serial cable 123. The mobile unit 105 displays the result by the display 122. In case of measuring the carrier on the mobile unit 105 side, it is measured by using the tuner unit 118 and is displayed by the display 122. The down frequency is measured by the connection device 104. The up frequency is measured by the mobile unit 105. In the case where the channels to be used is limited, the measurement is sequentially executed with respect to the order of the channels. With this method, there is no need to measure the unnecessary frequencies.

Therefore, even if the performances of the tuner unit 111 and radio I/F unit 117 are different, the radio wave environment on the connection device 104 side can be displayed by the display 122 of the mobile unit 105.

Figure 14:
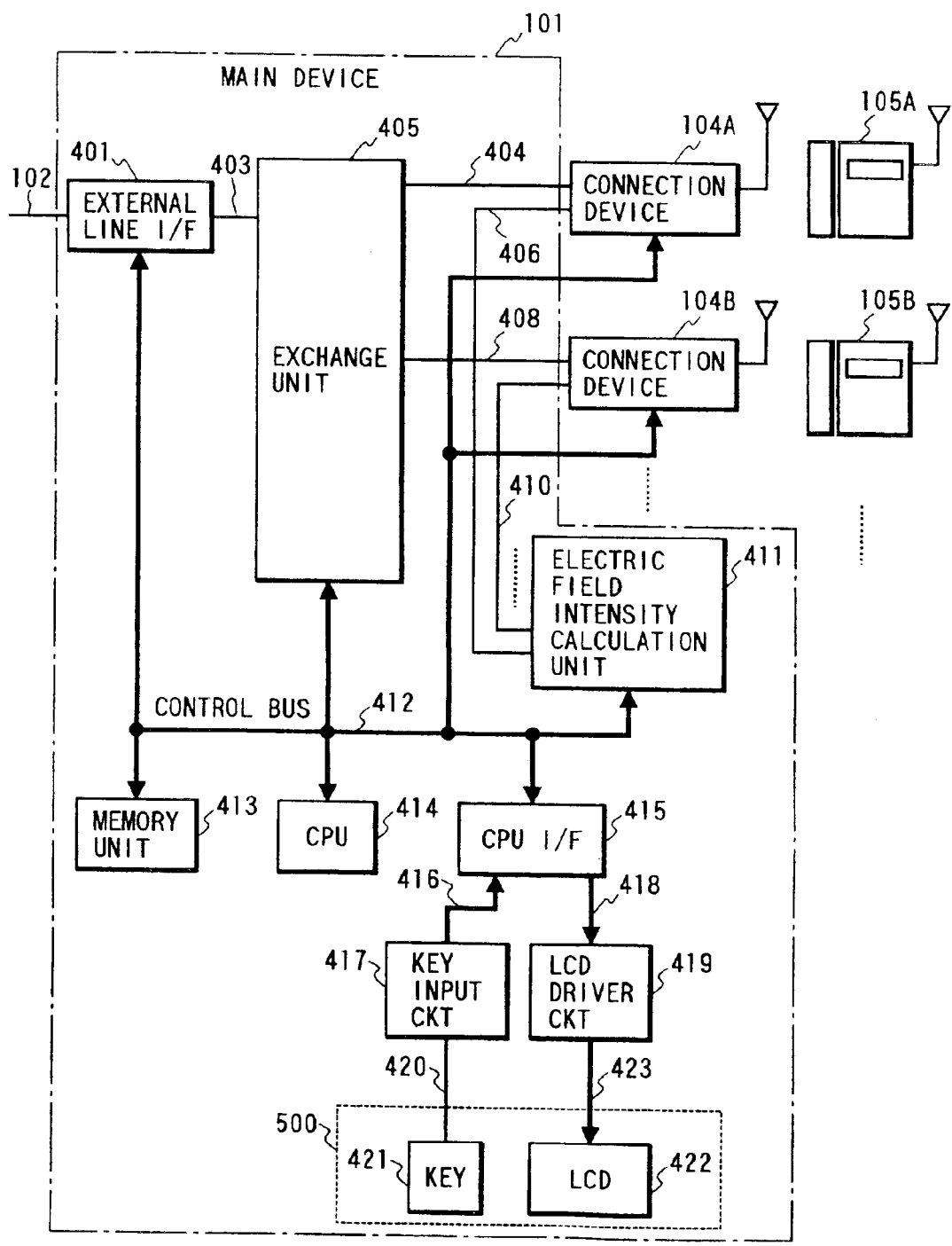
FIG. 14 is a block diagram showing a second radio communicating apparatus embodying the invention.

FIG. 14 is a block diagram showing the second radio communicating apparatus embodying the invention.

In the diagram, the main device 101 is a control apparatus for controlling the whole radio communicating apparatus. The external line 102 is enclosed in the main device 101. A plurality of mobile units 105A and 105B are enclosed in the extensions. An external line interface 401 encloses the external line 102 and executes the generating and receiving operations to/from the external line. The external line interface 401 is connected to an exchange unit 405 through a voice speech path 403 for transmitting and receiving a voice signal and is also connected to a control bus 412.

Connection devices 104A and 104B transmit and receive radio signals to/from the mobile units 105A and 105B and are connected to the exchange unit 405 through voice speech paths 404 and 408 and are also connected to the control bus 412. Further, the connection devices 104A and 104B are connected to an electric field intensity calculation unit 411 through signal lines 406 and 410.

A central processing unit (CPU) 414 controls the radio communicating apparatus and is connected to the external line interface 401, the exchange unit 405, the connection devices 104A and 104B, a memory unit 413, a CPU interface 415, and the electric field intensity calculation unit 411.

The CPU interface 415 sends data to be displayed to an LCD 422 from the control bus 412 to an LCD driver circuit 419 and receives data of a key 421 from a key input circuit 417 and supplies to the control bus 412.

Reference numeral 500 denotes an operation panel including the key 421 and LCD 422.

In the radio communicating apparatus as mentioned above, the operation in case of observing a radio environmental situation when the apparatus is installed to a predetermined location will now be described.

In order to search the radio wave environment of the connection device 104A, the operator executes a specific operation for shifting to a radio wave environment measuring mode to measure the radio wave environment and for inputting a number to designate the connection device 104 from the key 121 of the main device 101.

Figure 18:
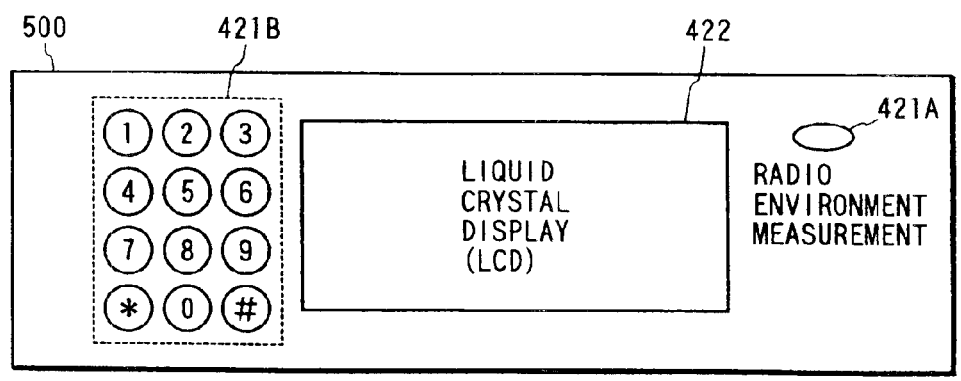
FIG. 18 is a plan view showing a key arrangement.

FIG. 18 is a plan view showing an arrangement of the key 421.

The operation panel 500 is annexed to the main device 101 and is constructed so as to have the liquid crystal display (LCD) 422, a radio environment measurement shift key 421A, and a dial key 421B. When the operator depresses the radio environment measurement shift key 421A, key information is transmitted from the key input circuit 417 to the CPU 414 through a signal line 416 and the CPU interface 415.

When receiving the signal, the CPU 414 transmits information indicative of the shift to the radio environment measuring mode to the LCD 422 through the CPU interface 415, a signal line 418, and the LCD driver circuit 419, thereby promoting the operator to input the number of the connection device for performing the measurement.

When the operator inputs the number to designate the connection device 104A, for example, an extension number 01 by the dial key 421B, the signal is inputted from the input circuit 417 through the signal line 416 and is transmitted to the CPU 414 through the CPU interface 415 and control bus 412.

When receiving the information, the CPU 414 instructs the connection device 104A designated from the dial key 421B through the control bus 412 so as to detect a radio reception carrier.

In case of designating the other connection device 104, by inputting an extension number to designate the other connection device 104 by the dial key 421B, the CPU 414 similarly instructs the designated connection device 104 so as to detect the radio reception carrier.

Figure 15:
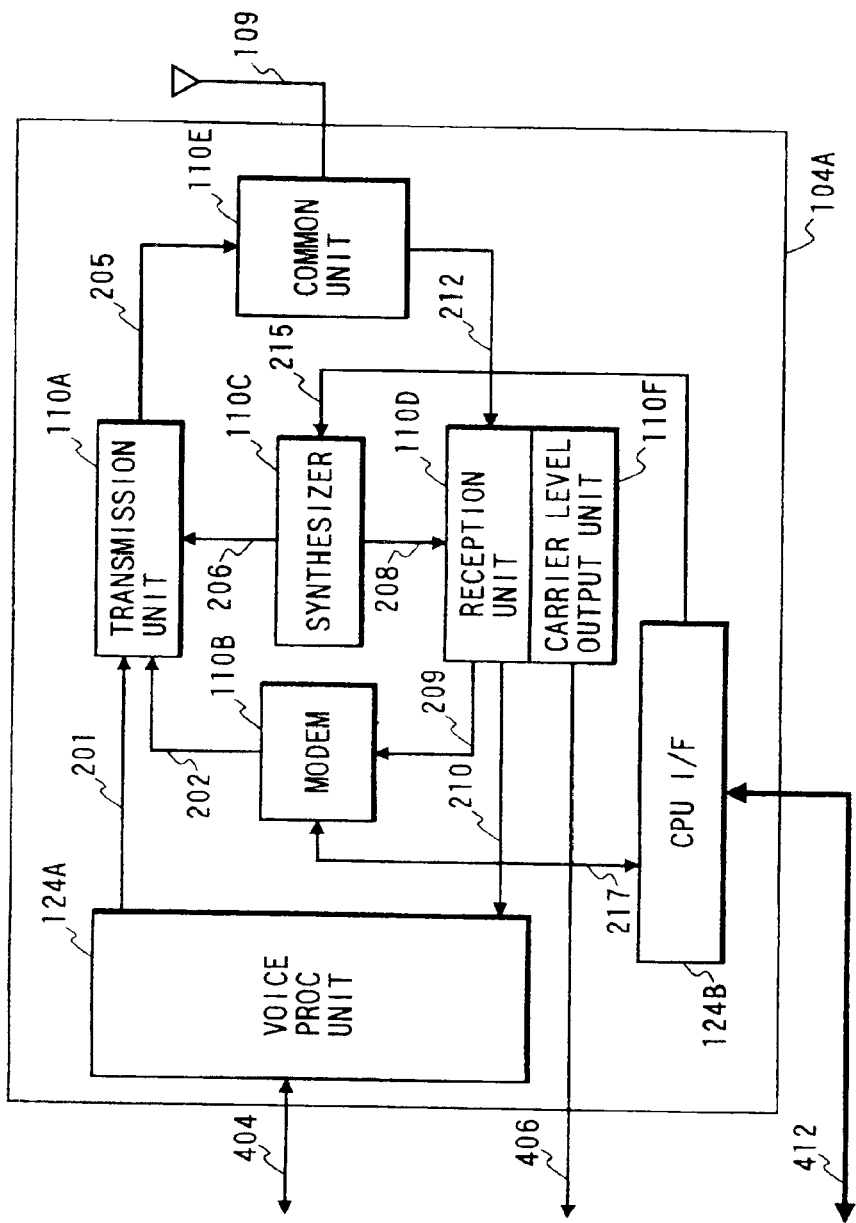
FIG. 15 is a block diagram showing a connection device.

FIG. 15 is a block diagram showing the connection device 104A.

A voice processing unit 124A is connected to the voice speech path 404, is connected to a radio transmission unit 110A through a signal line 201, and is connected to a radio reception unit 110D through a signal line 210. The transmission unit 110A is connected to a common unit 110E through a signal line 205, is connected to a modem 110B through a signal line 202, and is connected to a synthesizer 110C through a signal line 206.

The reception unit 110D is connected to the common unit 110E through a signal line 212, is connected to the modem 110B through a signal line 209, and is connected to the synthesizer 110C through a signal line 208. The modem 110B transmits and receives the control data to/from a CPU interface 124B through a signal line 217. The modem 110B sends the data to the transmission unit 110A through the signal line 202 and receives the data from the reception unit 110D through the signal line 209.

The synthesizer 110C supplies a frequency of the radio channel that is instructed from the CPU interface 124B through a signal line 215 to the transmission unit 110A through the signal line 206 and also supplies to the reception unit 110D through the signal line 208.

The common unit 110E is connected to the antenna 109 and separates the transmission radio wave and the reception radio wave, respectively, and is connected to the transmission unit 110A and reception unit 110D. A carrier level output unit 110F is connected to the radio reception unit 110D and generates the received carrier level of the selected radio channel to the signal line 406.

The CPU interface 124B is connected to the CPU 414 through the control bus 412. When an instruction signal is received from the CPU 414, the CPU interface 124B sets a reception channel frequency of the synthesizer 110C through the signal line 215 to the designated value.

The synthesizer 110C transmits the set frequency signal to the reception unit 110D through the signal line 208. The reception unit 110D receives a spatial radio wave according to the received frequency signal from the antenna 109, extracts the carrier level of the radio wave of such a frequency, converts the carrier level into an analog signal corresponding to an intensity of the radio wave, and sends the analog signal to the signal line 406. The analog signal sent to the signal line 406 is transmitted to the electric field intensity calculation unit 411.

Figure 16:
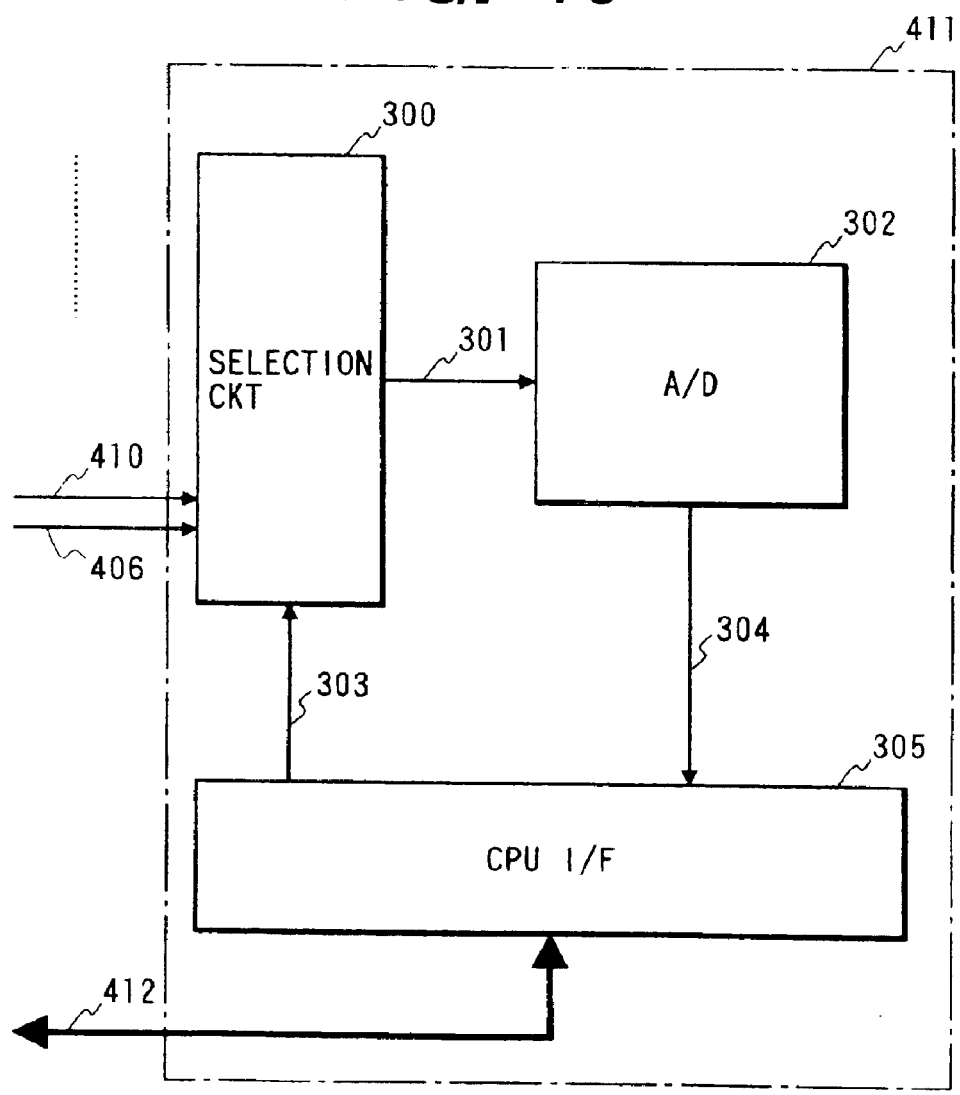
FIG. 16 is a block diagram showing an electric field intensity calculation unit.

FIG. 16 is a block diagram showing a construction of the electric field intensity calculation unit 411.

The electric field intensity calculation unit 411 is constructed by: a selection circuit 300 for selecting the signal of the connection device 104 designated in the CPU 414 from a plurality of analog signals indicative of the carrier levels sent from the radio transmission and reception units; an A/D conversion unit 302 for analog/digital converting the selected analog signal into the digital signal through a signal line 301; and a CPU interface 305 connected to the control bus 412.

When the instruction from the CPU 414 is received, the CPU interface 305 selects one (signal line 406) of the analog signals which are inputted through a signal line 303 and outputs to the signal line 301.

The A/D conversion unit 302 successively converts the received analog signal into the digital signal and sends to a signal line 304. The CPU interface 305 sends the data indicative of the level of the carrier signal which was digital converted to the CPU 414 through the control bus 412.

Although not shown, the average value for a predetermined time designated by an instruction from the CPU 414 can be also obtained in the A/D conversion unit 302. The data indicative of the average level of the carrier signals can be also sent to the CPU 414. When the operator executes the above operation in order to measure the radio environment from the key 421, the CPU 414 instructs so as to first set the connection device 104A into the receiving state of one channel through the control bus 412.

The radio communicating apparatus of the embodiment is not limited to the analog system but can be also realized with respect to, for example, the digital system. The connection device 104 locks the synthesizer 110C to one channel of the received frequency by an instruction from the CPU 414 and supplies a 1-channel designation signal to the reception unit 110D through the signal line 208.

When the reception unit 110D is designated to one channel, the signal which has a band width of one channel arriving from the antenna 109 and is tuned with the frequency of one channel is sent to the carrier level output unit 110F and is detected and converted into the analog signal. The analog signal is outputted to the signal line 406.

When the electric field intensity calculation unit 411 receives the analog signal, the selection circuit 300 is set by the CPU 414 so as to select the signal line 406 among a plurality of input signal lines. The analog signal is outputted to the signal line 301 and inputted to the A/D conversion unit 302.

The A/D conversion unit 302 converts the analog signal into the digital code of 8 bits and sends to the CPU 414 through the signal line 304 and CPU interface 305. When the CPU 414 receives the data of the digital code, the CPU 414 immediately writes the data to the LCD driver circuit 419 through the control bus 412, CPU interface 415, and signal line 418. The LCD driver circuit 419 converts the data so as to correspond to a dot matrix of the LCD 422 and drives the LCD 422.

Figure 17:
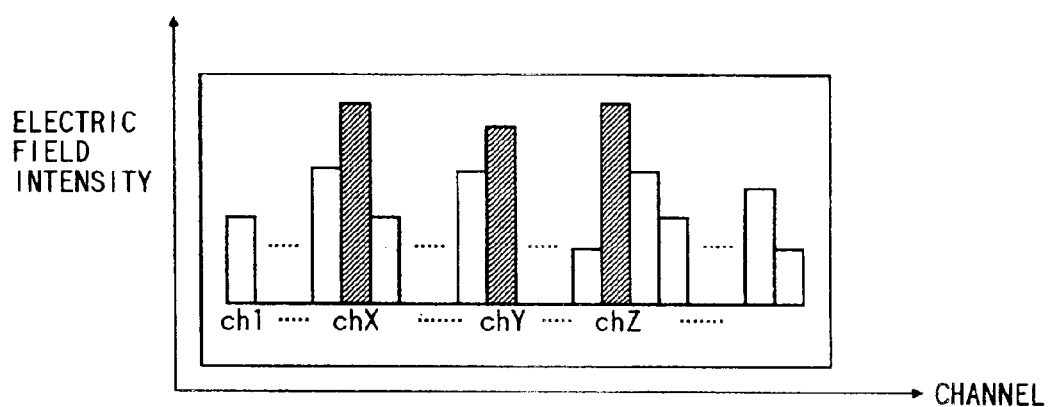
FIG. 17 is an explanatory diagram showing an example of a display of the LCD.

As shown in FIG. 17, a channel 1 is displayed as a bar graph of ch1. Subsequently, the CPU 414 instructs the connection device 104A so as to receive the signal by the channel 2 through the control bus 412.

When receiving an instruction from the CPU 414, in a manner similar to the channel 1, the synthesizer 110C is set and the analog signal is outputted to the signal line 406 as a detection signal from the carrier level output unit 110F while tuning with the radio wave from the antenna 109. The analog signal is converted into the digital signal of 8 bits by the electric field intensity calculation unit 411. The digital signal is again displayed by a bar graph on the LCD 422 as shown in FIG. 17.

In a manner similar to the above, for example, the carrier levels from the connection device 104A of up to the channel 89 are converted into the digital signals and displayed on the LCD 422. The processes for displaying the digital values of all of the channels 1 to 89 are finished.

Whether the process is finished at an arbitrary number of times or is repeated without a limitation can be previously registered by a software. For example, in the case where when the carrier whose electric field intensity is equal to or larger than 2 $\mu$V is detected, the use of the channel is inhibited, as shown in FIG. 17, in the bar graph, three channels of chX, chY, and chZ are painted in black. This means that the electric field intensity is equal to or larger than 2 $\mu$V and it will be understood that those channels cannot be used.

The displaying method of the LCD 422 is not limited to the bar graph but the value of the electric field intensity or the numerical value corresponding to it can be also displayed. It is also possible to designate an arbitrary channel by the setting by the dial key 421B and to display an electric field intensity of the channel.

In place of displaying by the LCD 422, the value of the electric field intensity can be also shown by a voice sound. It is also possible to construct in a manner such that a voice synthesizing unit is connected to the exchange unit 405 through a speech communication path and a voice output unit is connected through another speech communication path and a speaker is connected to the voice output unit. With such a construction, the detected carrier level can be also outputted and indicated by a voice sound.

Figure 19:
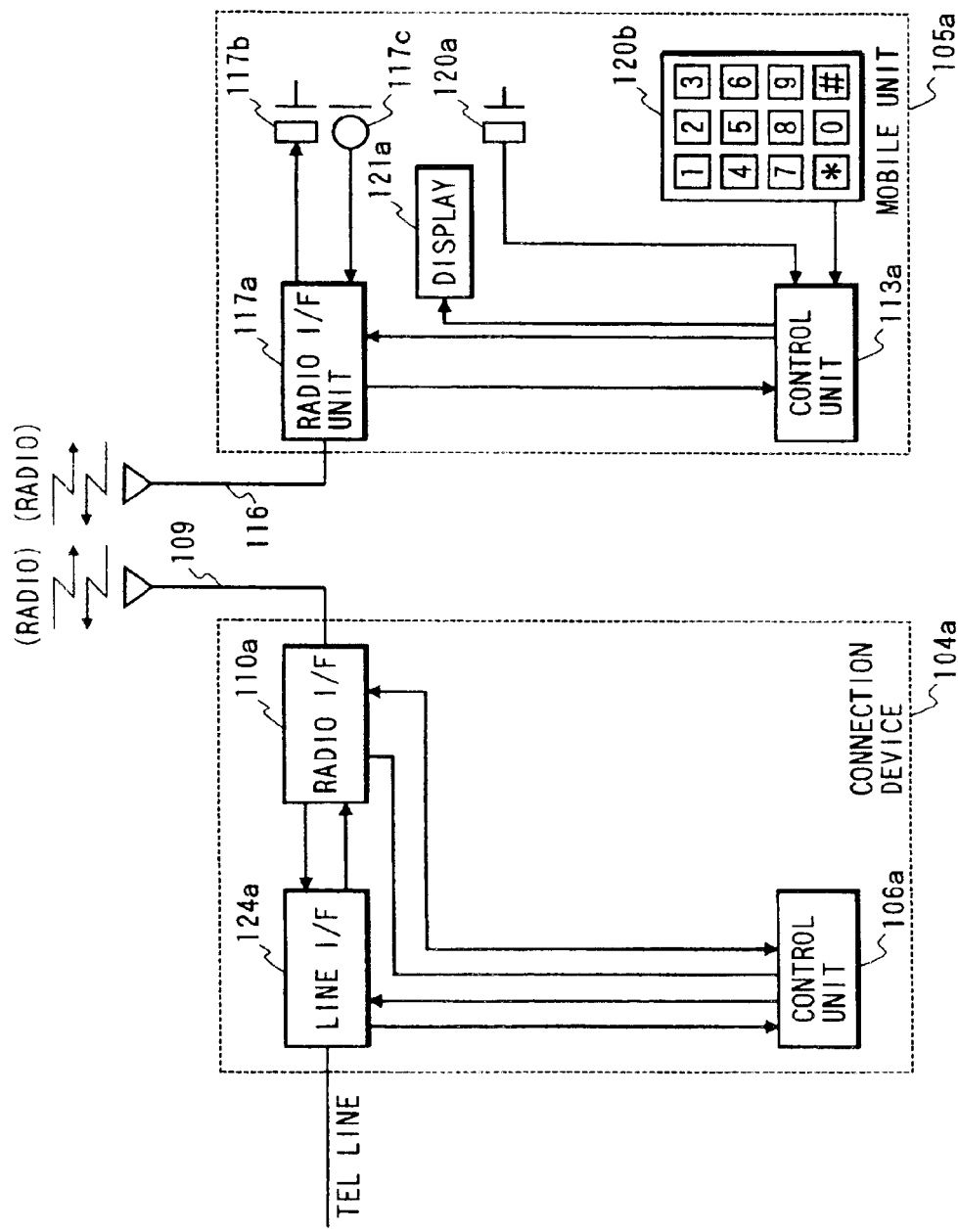
FIG. 19 is a block diagram showing a third radio communicating apparatus embodying the invention.

FIG. 19 is a block diagram showing a construction of the third radio communicating apparatus embodying the invention.

As shown in FIG. 19, the radio communicating apparatus is constructed by a cordless telephone apparatus comprising a connection device 104a and a mobile unit 105a for performing a radio communication with the connection device 104a.

The connection device 104a has a line interface unit 124a and a radio interface unit 110a for executing the connecting operation with a telephone line at the time of the generation and reception.

The radio interface unit 110a executes a control of a radio communication with the mobile unit 105a, a detecting process for detecting an intensity of the radio wave from the mobile unit 105a received by the antenna 109, and a notifying process for notifying the mobile unit 105a of a radio wave intensity notification message indicative of the intensity of the radio wave from the mobile unit 105a detected by the detecting process by a radio wave of a predetermined frequency.

The control of the radio communication with the mobile unit 105a which is executed by the radio I/F unit 110a includes: a transmitting process for converting the signal from the telephone line to a radio wave of a predetermined frequency and, thereafter, for transmitting from the antenna 109; and a receiving process for demodulating the radio wave from the mobile unit 105a which was received by the antenna 109 and, thereafter, for sending to the line I/F unit 124a.

The operation of the line I/F unit 124a and the operation of the radio I/F unit 110a are controlled by a control unit 106a. The above notifying process is controlled so as to be executed at a predetermined interval.

The mobile unit 105a has a radio I/F unit 117a and a display 121a.

The radio I/F unit 117a executes: a control of the radio communication with the connection device 104a; a detecting process for detecting the intensity of radio wave from the connection device 104a received by the antenna 116 and for outputting radio wave intensity information indicative of the detected intensity of the radio wave from the connection device 104a to a control unit 113a; and a process for outputting a radio wave intensity notification message notified from the connection device 104a to the control unit 113a.

The control of the radio communication with the connection device 104a which is executed by the radio I/F unit 117a includes: a transmitting process for converting a voice signal outputted from a microphone 117c and a transmission signal generated from the control unit 113a into a radio wave of a predetermined frequency and, thereafter, for transmitting from the antenna 116; and a process for demodulating the radio wave from the connection device 104a received by the antenna 116 and, thereafter, for outputting the voice signal included in the demodulation signal to a speaker 117b and for extracting a radio wave intensity notification message included in the demodulation signal.

The control unit 113a controls the operation of the radio I/F unit 117a and controls so as to display symbols indicative of the intensity of each of the radio waves to be displayed on the display 121a in accordance with radio wave intensity information and the radio wave intensity notification message which were given from the radio I/F unit 117a. In the display control, for example, the degree of the intensity of the radio wave is previously divided into three stages and the intensity of the radio wave at each stage is set so as to be expressed by the number (integer of 0 to 2) of marks "(". It is shown that the intensity of the radio wave is strong as the number of marks is large.

The start and end of a speech communication are instructed to the control unit 113a by a depressing operation of a speech button 120a. A dial number to the partner side is inputted from a dial input unit 120b to the control unit 113a.

Figure 20:
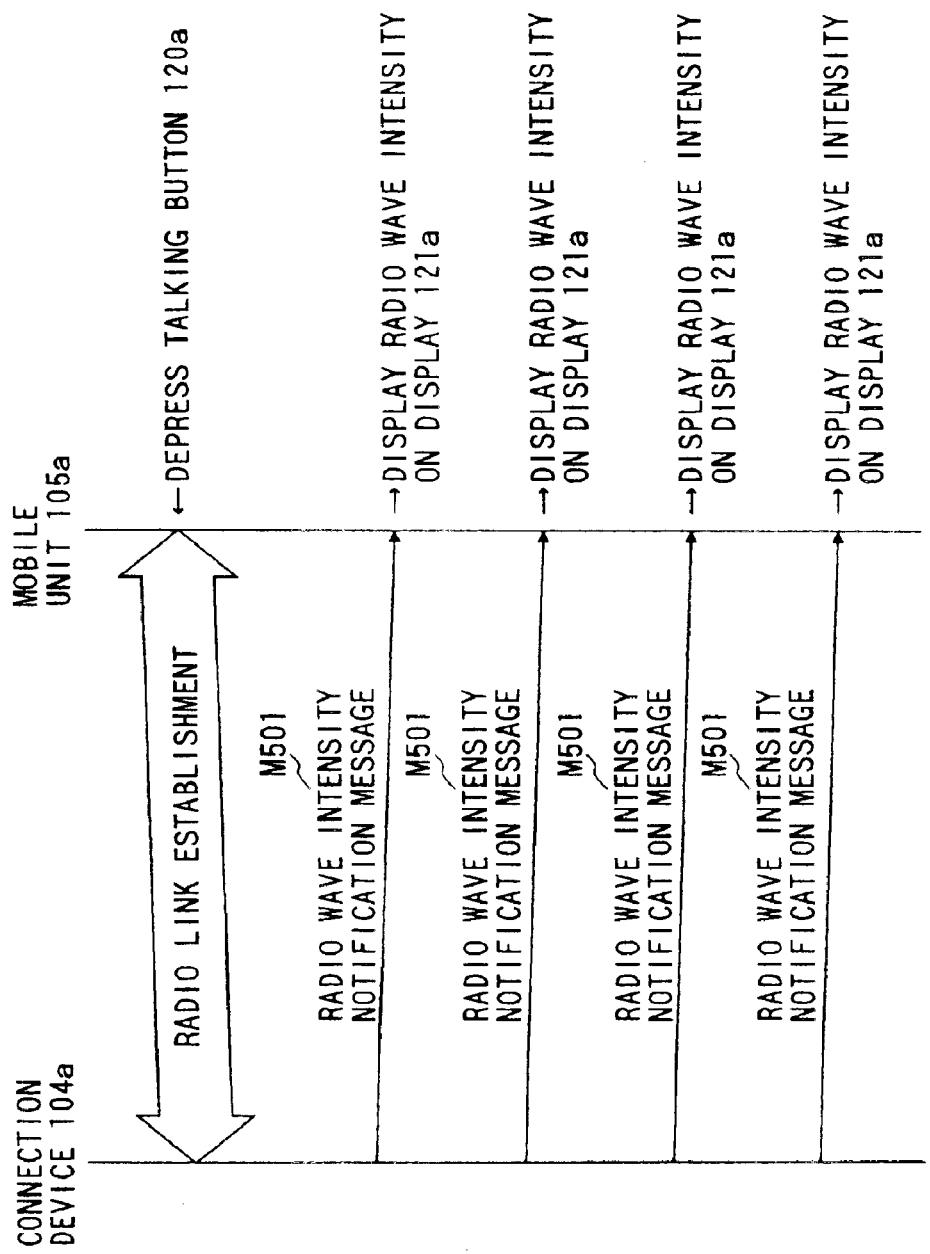
FIG. 20 is a diagram showing a sequence between a connection device and a mobile unit of the radio communicating apparatus.

A sequence between the connection device 104a and mobile unit 105a will now be described with reference to FIG. 20. FIG. 20 is a diagram showing the sequence between the connection device 104a and mobile unit 105a of the radio communicating apparatus in FIG. 19.

Referring now to FIG. 20, when the user of the mobile unit 105a depresses the speech button 120a in order to start a speech communication or to respond to a reception, a radio link is established between the connection device 104a and mobile unit 105a, so that the apparatus enters an in-speech state.

When the apparatus is set into the in-speech state, in the connection device 104a, the radio I/F unit 110a receives the radio wave transmitted from the mobile unit 105a and the radio I/F unit 124a detects the intensity of the radio wave. The control unit 106a forms a radio wave intensity notification message M501 indicative of the intensity from the detected intensity of the radio wave and transmits from the radio I/F unit 110a at a predetermined interval.

The radio wave intensity notification message M501 transmitted from the connection device 104a is received by the radio I/F unit 117a of the mobile unit 105a together with the radio wave transmitted from the connection unit 104a. The radio I/F unit 117a detects the intensity of the radio wave transmitted from the connection device 104a. The radio wave intensity information indicative of the detected intensity of the radio wave is supplied to the control unit 113a together with the radio wave intensity notification message M501.

The control unit 113a controls so as to display a symbol indicative of the degree of the intensity of each radio wave to the display 121a in accordance with the radio wave intensity information indicative of the detected intensity of the radio wave from the connection device 104a and the radio wave intensity notification message M501. The degree of the intensity of the radio wave from the connection device 104a which is received by the mobile unit 105a and the degree of the intensity of the radio wave from the mobile unit 105a which is received by the connection device 104a are displayed on the display 121a.

Figure 21A:
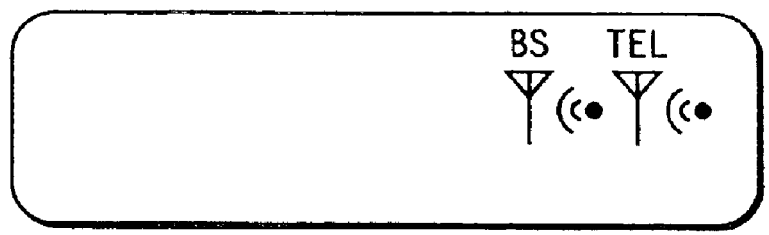
FIGS. 21A to 21C are diagrams showing display examples of a degree of intensity of a radio wave.
Figure 21B:
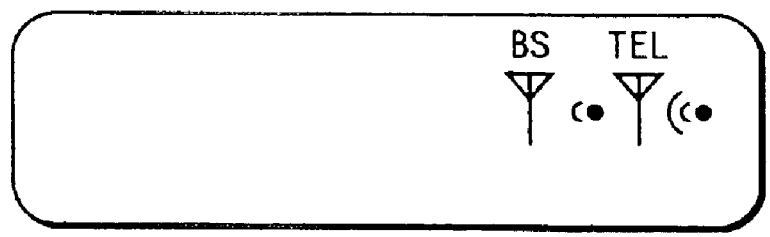
Figure 21C:
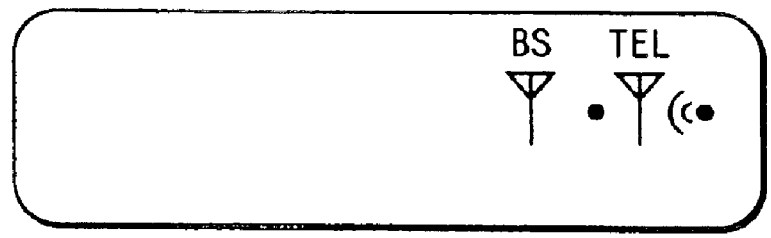

A display example of the degree of the intensity of the radio wave from the connection device 104a which is received by the mobile unit 105a and the degree of the intensity of the radio wave from the mobile unit 105a which is received by the connection device 104a by the display 121a provided for the mobile unit 105a will now be described with reference to FIGS. 21A to 21C. FIGS. 21A to 21C are diagrams showing the display example of the degree of the intensity of the radio wave which is received from the connection device 104a by the mobile unit 105a and the degree of the intensity of the radio wave which is received from the mobile unit 105a by the connection device 104a by the display 121a provided for the mobile unit 105a of the radio communicating apparatus in FIG. 19.

As shown in FIGS. 21A to 21C, the degree of the intensity of the radio wave which is received from the connection device 104a by the mobile unit 105a and the degree of the intensity of the radio wave which is received from the mobile unit 105a by the connection device 104a are separately displayed on the screen of the display 121a of the mobile unit 105a by three stages. From the right upper end side of the screen of the display 121a, a black painted circle indicative of the connecting device 104a, "TEL" and an antenna mark indicative of the mobile unit 105a side, a black painted circle indicative of the mobile unit 105a, and "BS" and an antenna mark indicative of the connection device 104a side are displayed. The degree of the intensity of the radio wave which is received from the connection device 104a by the mobile unit 105a is displayed between the black painted circle indicative of the connection device 104a and the antenna mark indicative of the mobile unit 105a side by the mark or marks "(" of the number corresponding to such an intensity. On the other hand, the degree of the intensity of the radio wave which is received from the mobile unit 105a by the connection device 104a is displayed between the black painted circle indicative of the mobile unit 105a and the antenna mark indicative of the connection device 104a side by the mark or marks "(" of the number corresponding to such an intensity.

For example, now assuming that the degree of the intensity of the radio wave which is received from the mobile unit 105a by the connection device 104a is strong and the degree of the intensity of the radio wave which is received from the connection device 104a by the mobile unit 105a is strong, as shown in FIG. 21A, as a degree of the intensity of the radio wave which is received from the mobile unit 105a by the connection device 104a, two marks "(" are displayed between the black painted circle indicative of the mobile unit 105a and the antenna mark "BS" indicative of the connection device 104a side. As a degree of the intensity of the radio wave which is received from the connection device 104a by the mobile unit 105a, two marks "(" are displayed between the black painted circle indicative of the connection device 104a and the antenna mark "TEL" indicative of the mobile unit 105a side.

Now, assuming that the degree of the intensity of the radio wave which is received from the mobile unit 105a by the connection device 104a is middle and the degree of the intensity of the radio wave which is received from the connection device 104a by the mobile unit 105a is strong, as shown in FIG. 21B, as a degree of the intensity of the radio wave which is received from the mobile unit 105a by the connection device 104a, one mark "(" is displayed between the black painted circle indicative of the mobile unit 105a and the antenna mark "BS" indicative of the connection device 104a side. As a degree of the intensity of the radio wave which is received from the connection device 104a by the mobile unit 105a, two marks "(" are displayed between the black painted circle indicative of the connection device 104a and the antenna mark "TEL" indicative of the mobile unit 105a side.

Now, assuming that the degree of the intensity of the radio wave which is received from the mobile unit 105a by the connection device 104a is weak and the degree of the intensity of the radio wave which is received from the connection device 104a by the mobile unit 105a is strong, as shown in FIG. 21C, as a degree of the intensity of the radio wave which is received from the mobile unit 104a by the connection device 104a, the mark "(" is not displayed between the black painted circle indicative of the mobile unit 105a and the antenna mark "BS" indicative of the connection device 104a side. As a degree of the intensity of the radio wave which is received from the connection device 104a by the mobile unit 105a, two marks "(" are displayed between the black painted circle indicative of the connection device 104a and the antenna mark "TEL" indicative of the connection device 104a side.

In FIGS. 21A to 21C, although the explanation has been made on the assumption that the degree of the intensity of the radio wave which is received from the connection device 104a by the mobile unit 105a is strong, when the degree of the intensity of the radio wave changes, the number of marks "(" which are displayed also similarly changes.

As mentioned above, since the intensity of the radio wave which is received from the mobile unit 105a by the connection device 104a is displayed on the display 121a together with the intensity of the radio wave which is received from the connection device 104a by the mobile unit 105a during the speech communication, the accurate information to obtain the good speech communication can be provided for the user of the mobile unit 105a in both of the direction from the mobile unit 105a to the connection device 104a and the direction from the connection device 104a to the mobile unit 105a.

By transmitting the radio wave intensity notification message M501 at a predetermined interval, an electric power consumption which is required to transmit the radio wave intensity notification message M501 can be reduced.

Figure 22:
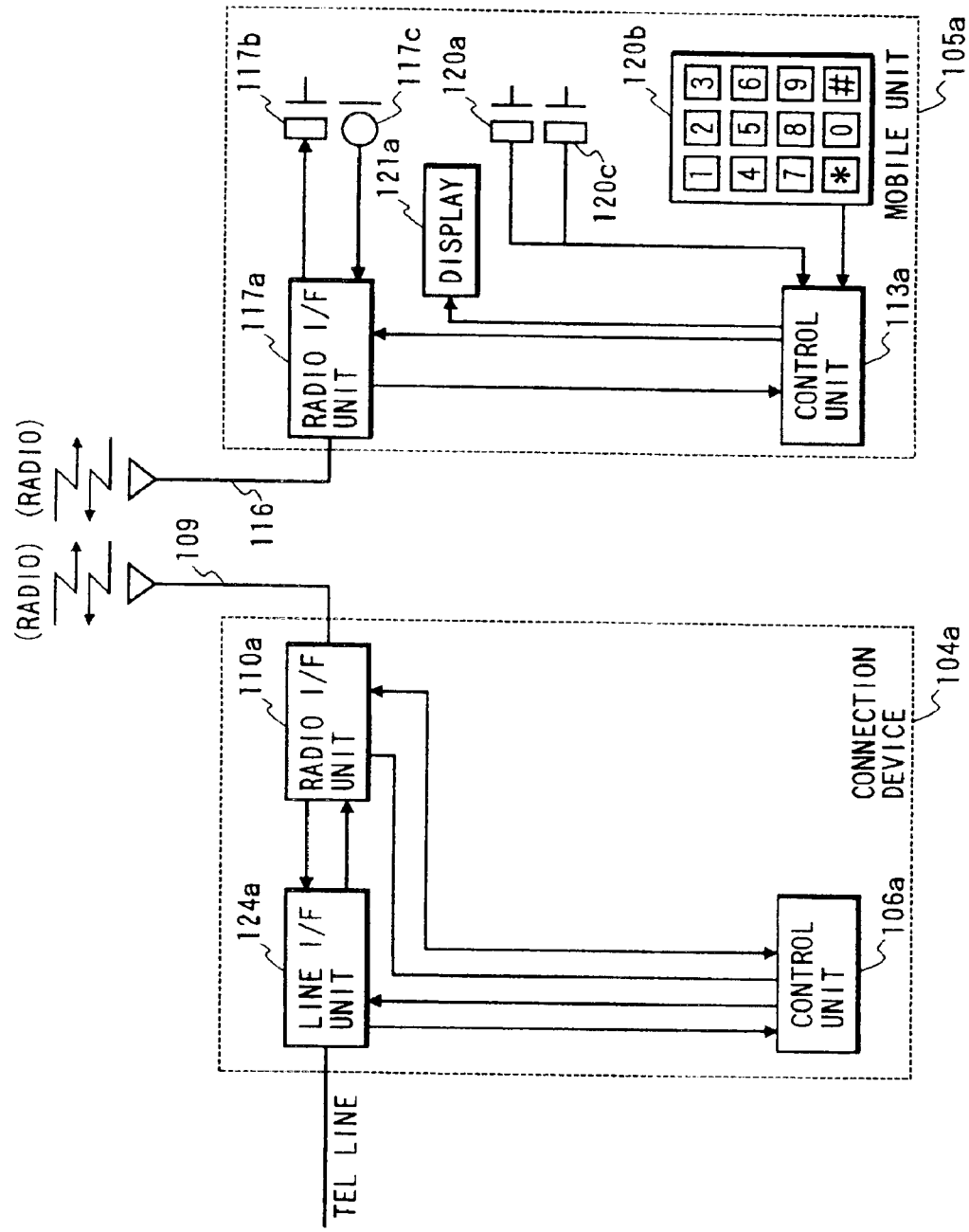
FIG. 22 is a block diagram showing a construction of a modification of the third radio communicating apparatus embodying the invention.

In the case where the apparatus is set in a manner such that when the intensity of the radio wave from the mobile unit 105a changes, the connection device 104a transmits the radio wave intensity notification message M501, the electric power consumption which is required to transmit the radio wave intensity notification message M501 can be further reduced. In the example of FIGS. 19 and 20, when the apparatus enters the in-speech state, the radio wave intensity notification message M501 is transmitted. However, as shown in FIG. 22, it is also possible to construct in a manner such that a connection device is provided for the mobile unit 105a, a radio wave intensity display button 120c is provided, and the control unit 113a instructs so as to transmit a radio wave intensity notification start message or a radio wave intensity notification end message to the radio I/F unit 117a by a depressing operation of the connection device radio wave intensity display button 120c. The radio wave intensity notification start message is a message to instruct the connection device 104a to start the notification of the radio wave intensity message. The radio wave intensity notification end message is a message to instruct the connection device 104a to finish the notification of the radio wave intensity message.

When the radio wave intensity notification start message is received by the connection device 104a, the transmission of the radio wave intensity notification message from the radio I/F unit 110a is started.

A sequence between the connection device 104a and the mobile unit 105a will now be described with reference to FIG. 23.

Figure 23:
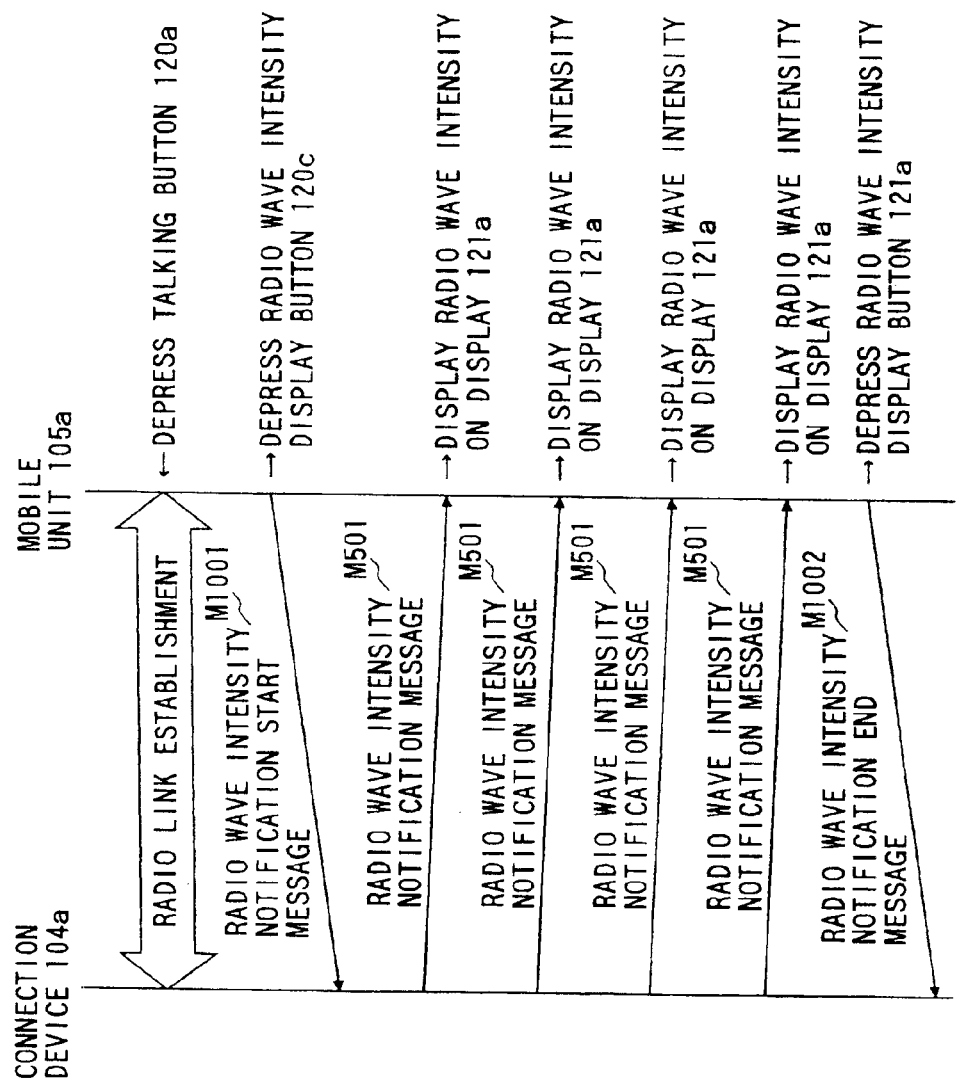
FIG. 23 is a diagram showing a sequence between the connection device and the mobile unit of the radio communicating apparatus.

Referring to FIG. 23, when the user of the mobile unit 105a depresses the speech button 120a in order to start the speech communication or to respond to the reception, a radio link is established between the connection device 104a and the mobile unit 105a and the apparatus enters an in-speech state.

When the apparatus enters the in-speech state, the connection device 104a receives the radio wave transmitted from the mobile unit 105a by the radio I/F unit 110a and detects the intensity of the radio wave.

In the speech state, when the connection device radio wave intensity display button 120c is depressed on the mobile unit 105a side, the control unit 113a instructs the radio I/F unit 117a to transmit a radio wave intensity notification start message M1001.

When the radio wave intensity notification start message M1001 is received by the connection device 104a, on the connection device 104a side, the transmission of the radio wave intensity notification message M501 from the radio I/F unit 110a is started.

The radio wave intensity notification message M501 transmitted from the connection device 104a is received by the radio I/F unit 117a of the mobile unit 105a together with the radio wave transmitted from the connection device 104a. The radio I/F unit 117a detects the intensity of the radio wave transmitted from the connection device 104a. Radio wave intensity information indicative of the detected intensity of the radio wave is supplied to the control unit 113a together with the radio wave intensity notification message M501.

The control unit 113a controls so as to display the symbols indicative of the degree of the intensity of each radio wave to the display 121a in accordance with the radio wave intensity information indicative of the detected intensity of the radio wave from the connection device 104a and the radio wave intensity notification message M501. The degree of the intensity of the radio wave from the connection device 104a and the degree of the intensity of the radio wave from the mobile unit 105a are displayed on the display 121a.

After that, the radio wave intensity notification message M501 is notified from the connection device 104a to the mobile unit 105a at every predetermined interval.

Subsequently, when the connection device radio wave intensity display button 120c is depressed on the mobile unit 105a side, the control unit 113a instructs the radio I/F unit 117a to transmit a radio wave intensity notification end message M1002.

When the radio wave intensity notification end message M1002 is received by the connection device 104a, on the connection device 104a side, the transmission of the radio wave intensity notification message M501 from the interface unit 110a is stopped.

The display of the degree of the intensity of the radio wave which is received from the connection device 104a by the mobile unit 105a and the degree of the intensity of the radio wave which is received from the mobile unit 105a by the connection device 104a by the display 121a provided for the mobile unit 105a is executed in a manner similar to that in FIGS. 21A to 21C and the description of the display is omitted here.

As mentioned above, since the presence or absence of the transmission of the radio wave intensity notification message M501 from the connection device 104a is selected by the depressing operation of the connection device radio wave intensity display button 120c by the user of the mobile unit 105a, when a modem signal is used in the communication between the connection device 104a and the mobile unit 105a, by selecting the absence of the transmission of the radio wave intensity notification message M501 from the connection device 104a, it is possible to avoid that an unpleasant sound of the modem signal which is caused each time the radio wave intensity notification message M501 is transmitted during the speech communication is mixed into the speech sound. Namely, it is possible to prevent a situation such that the unpleasant sound of the modem signal which is caused by the transmission of the radio wave intensity notification message M501 is mixed during an important speech communication.

In the above sequence, although the radio wave intensity notification message M501 has been transmitted at a predetermined interval, it is also possible to set in a manner such that the radio wave intensity notification message M501 is transmitted when the intensity of the radio wave which is received from the mobile unit 105a by the connection device 104a changes.

Figure 24:
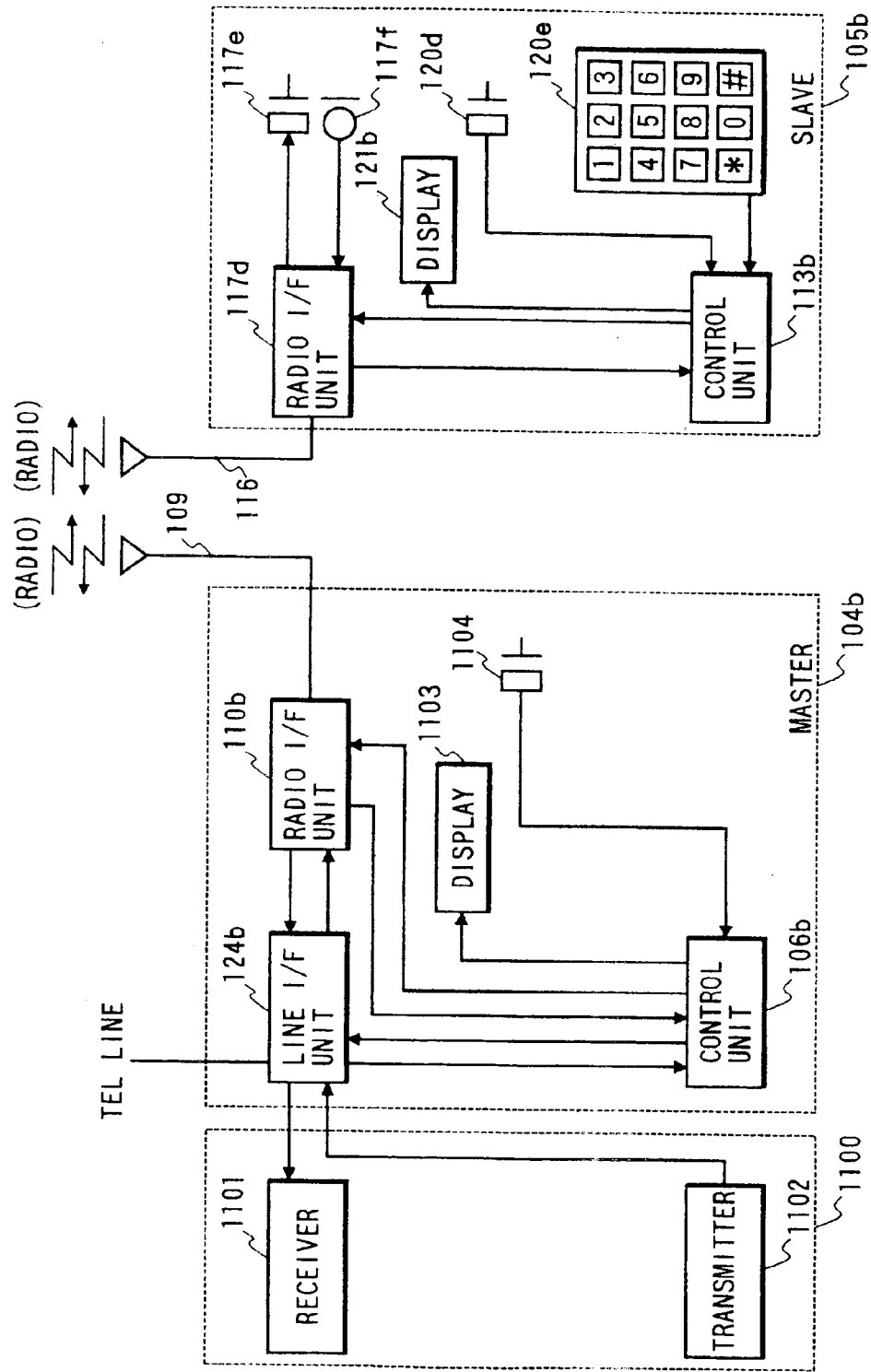
FIG. 24 is a block diagram showing a construction of the fourth radio communicating apparatus embodying the invention.

FIG. 24 is a block diagram showing a construction of the fourth radio communicating apparatus embodying the invention.

As shown in FIG. 24, the radio communicating apparatus is constructed by a cordless telephone apparatus comprising a master 104b to which a handset 1100 having a transmitter 1102 and a receiver 1101 is connected and a slave 105b for performing a radio communication with the master 104b.

The master 104b has a line I/F unit 124b for selectively connecting the handset 1100 and slave 105b to a telephone line upon generation and reception and a radio I/F unit 110b.

The radio I/F unit 110b executes: a control of the radio communication with the slave 105b; a detecting process for detecting an intensity of a radio wave from the slave 105b received by the antenna 109 and for outputting radio wave intensity information indicative of the detected intensity of the radio wave from the slave 105b to the control unit 106b; and a process for outputting the radio wave intensity notification message notified from the slave 105b to the control unit 106b.

The control of the radio communication with the slave 105b which is executed by the radio I/F unit 110b includes an external line process and an extension process. In the external line process, after the signal from the telephone line was modulated to a radio wave of a predetermined frequency, the radio wave is transmitted from the antenna 109 and, after the radio wave from the slave 105b received by the antenna 109 was demodulated, the demodulation signal is outputted to the line interface unit 124b.

In the extension process, after a voice signal outputted from the transmitter 1102 was modulated into a radio wave of a predetermined frequency, the radio wave is transmitted from the antenna 109 and, after the radio wave from the slave 105b received by the antenna 109 was demodulated, the demodulation signal is outputted to the line I/F unit 124b.

The control unit 106b controls the operation of the line I/F unit 124b and the operation of the radio I/F unit 1106 and controls so as to display a symbol indicative of the intensity of each radio wave by a display 1103 in accordance with the radio wave intensity information indicative of the intensity of the radio wave from the slave 105b supplied from the radio I/F unit 110b and the radio wave intensity notification message notified from the slave 105b. In the display control, for example, the degree of the intensity of the radio wave is previously divided into three stages and the intensity of the radio wave at each stage is set so as to be expressed by the number (integer of 0 to 2) of marks "(". The intensity of the radio wave is strong as the number of marks "(" increases.

An instruction to execute the above extension process is outputted to the control unit 106b by the depressing operation of a slave calling button 1104.

The slave 105b has a radio I/F unit 117d and a display 121b.

The radio I/F unit 117d executes a control of the radio communication with the master 104b and a process for detecting the intensity of the radio wave from the master 104b received by the antenna 116 and for transmitting the detected intensity of the radio wave from the master 104b as a radio wave intensity notification message from the antenna 116.

The control of the radio communication with the master 104b which is executed by the radio I/F unit 117d includes a process for converting a voice signal outputted from a microphone 117f into a radio wave of a predetermined frequency, thereafter, for transmitting from the antenna 116, for demodulating the radio wave from the master 104b received by the antenna 116, and thereafter, for outputting the voice signal included in the demodulation signal to a speaker 117e.

The operation of the radio I/F unit 117d is controlled by a control unit 113b. The control unit 113b is instructed to start a speech communication (speech communication by the external line or extension) with the master 104b by the depressing operation of a master calling button 120d. A dial number to the partner side is inputted from a dial input unit 120e to the control unit 113b.

A sequence between the master 104b and slave 105b will now be described with reference to FIG. 25. FIG. 25 is a diagram showing a sequence between the master and the slave of the radio communicating apparatus of FIG. 24.

Referring to FIG. 25, when the user of the handset 1100 of the master 104b depresses the slave calling button 1104 in order to perform an extension speech communication with the slave 105b, a radio link is established between the master 104b and the slave 105b and the apparatus enters an in-speech state.

When the apparatus enters the in-speech state, in the slave 105b, the radio wave transmitted from the master 104b is received by the radio I/F unit 117d and the intensity of the radio wave is detected. From the detected intensity of the radio wave, the radio wave intensity notification message M501 indicative of the intensity is formed and transmitted at a predetermined interval.

The radio wave intensity notification message M501 transmitted from the slave 105b is received by the radio I/F unit 110b of the master 104b together with the radio wave transmitted from the slave 105b. The radio I/F unit 110b detects the intensity of the radio wave transmitted from the slave 105b and the radio wave intensity information indicative of the detected intensity of the radio wave is supplied to the control unit 106b together with the radio wave intensity notification message M501.

The control unit 106b controls so as to display a symbol indicative of the degree of the intensity of each radio wave by the display 1103 in accordance with the radio wave intensity information indicative of the detected intensity of the radio wave from the slave 105b and the radio wave intensity notification message M501. The degree of the intensity of the radio wave from the master 104b and the degree of the intensity of the radio wave from the slave 105b are displayed on the display 1103.

In the sequence, although the radio wave intensity notification message M501 has been transmitted at a predetermined interval, it is also possible to set so as to transmit the radio wave intensity notification message M501 when the intensity of the radio wave from the master 104b changes.

Figure 26A:
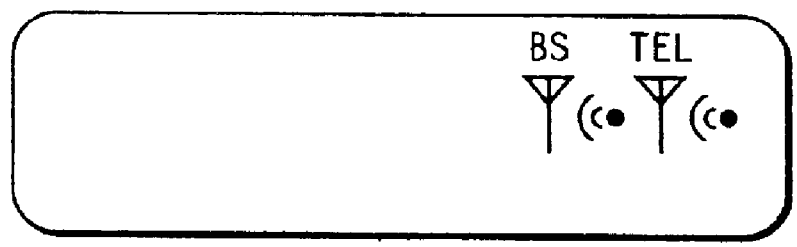
FIGS. 26A to 26C are diagrams showing display examples of a degree of intensity of a radio wave.
Figure 26B:
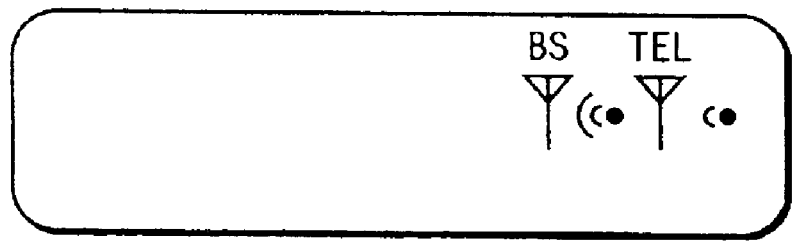
Figure 26C:
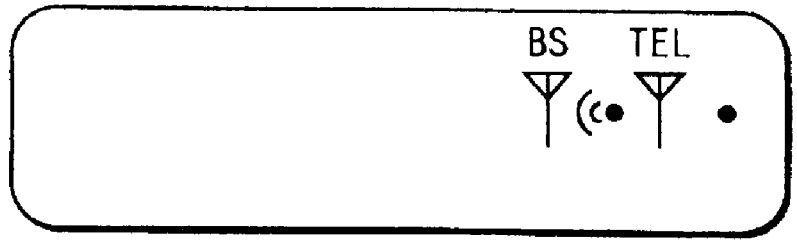

A display example of the degree of the intensity of the radio wave which is received from the master 104b by the slave 105b and the degree of the intensity of the radio wave which is received from the slave 105*b* by the master 104*b* by the display 1103 provided for the master 104*b* will now be described with reference to FIGS. 26A to 26C. FIGS. 26A to 26C are diagrams showing the display example in the case where the degree of the intensity of the radio wave which is received from the master 104*b* by the slave 105*b* and the degree of the radio wave which is received from the slave 105*b* by the master 104*b* are displayed by the display 1103 provided for the master of the telephone apparatus of FIG. 24.

As shown in FIGS. 26A to 26C, the degree of the intensity of the radio wave which is received from the master 104*b* by the slave 105*b* and the degree of the intensity of the radio wave which is received from the slave 105*b* by the master 104*b* are displayed on the screen of the display 1103 of the master 104*b* by three stages. From the right upper end side of the screen of the display 1103, a black painted circle indicative of the master 104*b*, "TEL" indicative of the slave 105*b* side and the antenna mark, a black painted circle indicative of the slave 105*b*, and "BS" indicative of the master 104*b* side and the antenna mark are displayed. The degree of the intensity of the radio wave which is received from the master 104*b* by the slave 105*b* is displayed between the black painted circle indicative of the master 104*b* and the antenna mark "TEL" indicative of the slave 105*b* side by the mark or marks "(" of the number corresponding to such an intensity. On the other hand, the degree of the intensity of the radio wave which is received from the slave 105*b* by the master 104*b* is displayed between the black painted circle indicative of the slave 105*b* and the antenna mark "BS" indicative of the master 104*b* side by the mark or marks "(" of the number corresponding to such an intensity.

For example, now assuming that the degree of the intensity of the radio wave which is received from the slave 105*b* by the master 104*b* is strong and the degree of the intensity of the radio wave which is received from the master 104*b* by the slave 105*b* is strong, as shown in FIG. 26A, as a degree of the intensity of the radio wave which is received from the slave 105*b* by the master 104*b*, two marks "(" are displayed between the black painted circle indicative of the slave 105*b* and the antenna mark "BS" indicative of the master 104*b* side. As a degree of the intensity of the radio wave which is received from the master 104*b* by the slave 105*b*, two marks "(" are displayed between the black painted circle indicative of the master 104*b* and the antenna mark "TEL" indicative of the slave 105*b* side.

Now, assuming that the degree of the intensity of the radio wave which is received from the slave 105*b* by the master 104*b* is strong and the degree of the intensity of the radio wave which is received from the master 104*b* by the slave 105*b* is middle, as shown in FIG. 26B, as a degree of the intensity of the radio wave which is received from the slave 105*b* by the master 104*b*, two marks "(" are displayed between the black painted circle indicative of the slave 105*b* and the antenna mark "BS" indicative of the master 104*b* side. As a degree of the intensity of the radio wave which is received from the master 104*b* by the slave 105*b*, one mark "(" is displayed between the black painted circle indicative of the master 104*b* and the antenna mark "TEL" indicative of the slave 105*b* side.

Now, assuming that the degree of the intensity of the radio wave which is received from the slave 105*b* by the master 104*b* is strong and the degree of the intensity of the radio wave which is received from the master 104*b* by the slave 105*b* is weak, as shown in FIG. 26C, as a degree of the intensity of the radio wave which is received from the slave 105*b* by the master 104*b*, three marks "(" are displayed between the black painted circle indicative of the slave 105*b* and the antenna mark "BS" indicative of the master 104*b* side. As a degree of the intensity of the radio wave which is received from the master 104*b* by the slave 105*b*, the mark "(" is not displayed between the black painted circle indicative of the master 104*b* and the antenna mark "TEL" indicative of the slave 105*b* side.

Although the above display example has been described on the assumption that the degree of the intensity of the radio wave which is received from the slave 105*b* by the master 104*b* is strong, if the degree of the intensity of the radio wave changes, the number of marks "(" which are displayed also similarly changes.

In the embodiment as mentioned above, since the intensity of the radio wave which is received from the master 104*b* by the slave 105*b* is displayed by the display 1103 together with the intensity of the radio wave which is received from the slave 105*b* by the master 104*b* during the speech communication, accurate information to obtain a good speech communication can be provided to the user of the master 104*b* in both of the direction from the slave 105*b* to the master 104*b* and the direction from the master 104*b* to the slave 105*b*.

Figure 27:
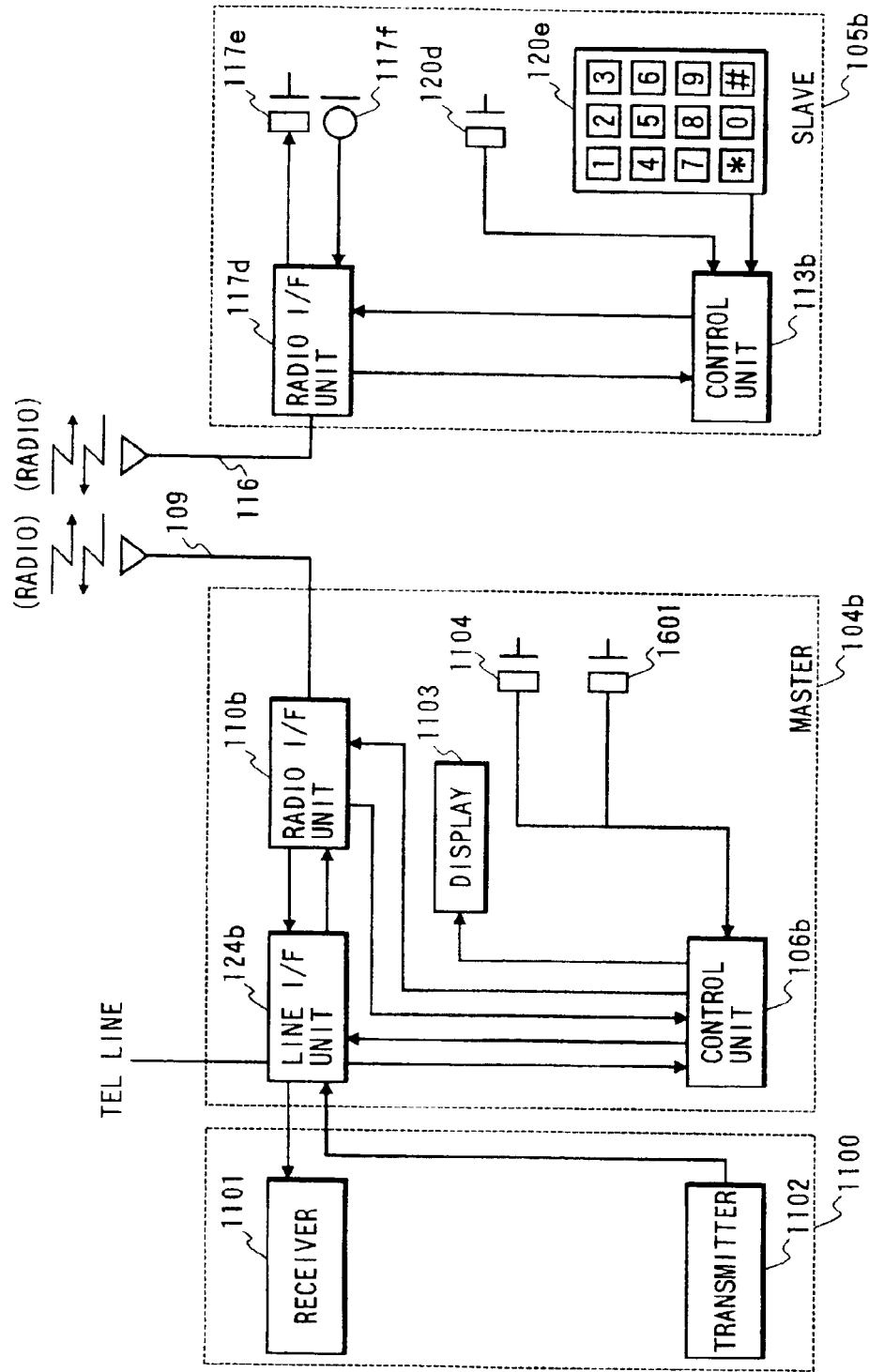
FIG. 27 is a block diagram showing a construction of a modification of the fourth radio communicating apparatus embodying the invention.

In the example of FIGS. 24 and 25, the radio wave intensity notification message M501 has been transmitted when the master 104*b* and slave 105*b* enter the in-speech state. However, as shown in FIG. 27, it is also possible to construct in a manner such that a slave radio wave intensity display button 1601 is provided for the master 104*b* and, by a depressing operation of the slave radio wave intensity display button 1601, a control unit 106*b* of the master 104*b* instructs the radio I/F unit 10*b* to transmit the radio wave intensity notification start message or radio wave intensity notification end message. The radio wave intensity notification start message is a message to instruct the slave 105*b* to start the notification of the radio wave intensity message. The radio wave intensity notification end message is a message to instruct the slave 105*b* to finish the notification of the radio wave intensity message.

When the radio wave intensity notification start message is received by the slave 105*b*, on the slave 105*b* side, the transmission of the radio wave intensity notification message from the radio I/F unit 117*d* is started.

A sequence between the master 104*b* and the slave 105*b* will now be described with reference to FIG. 28.

Figure 28:
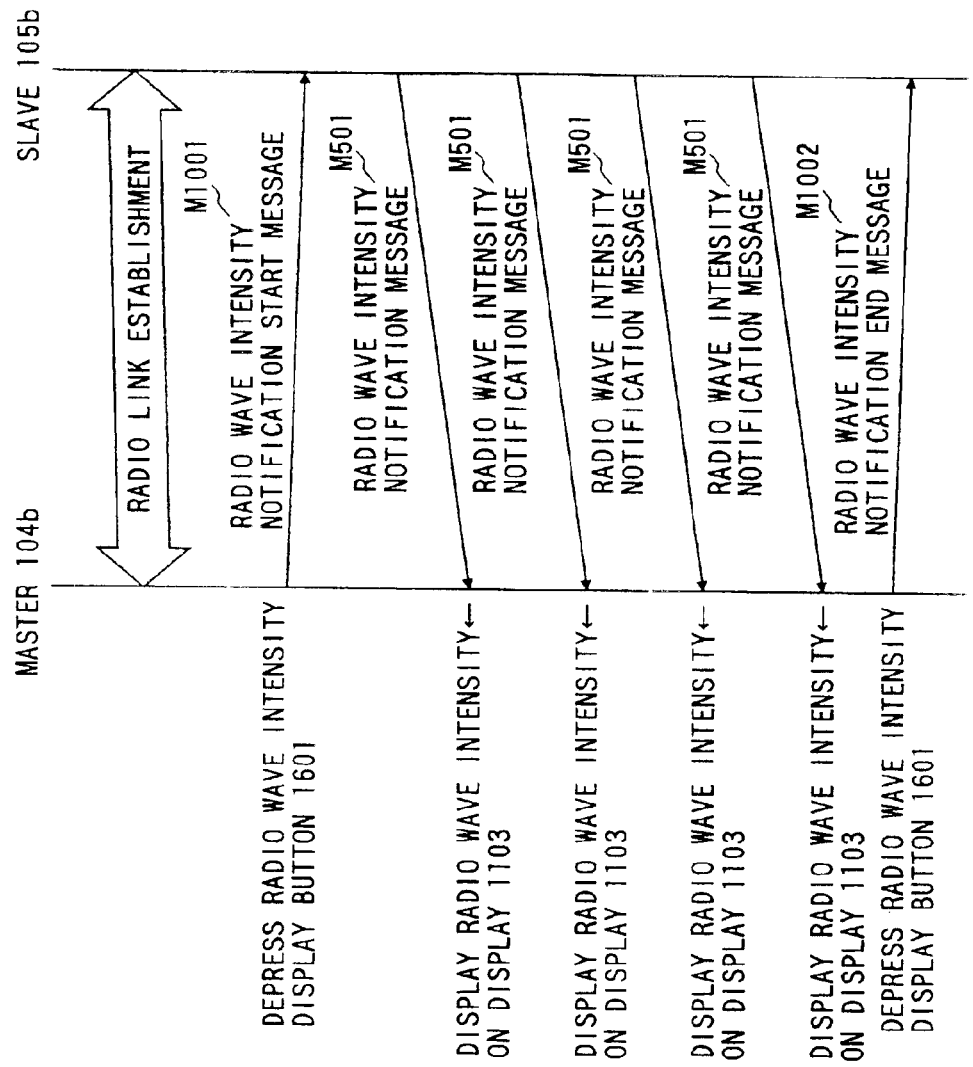
FIG. 28 is a diagram showing a sequence between a master and a slave of the radio communicating apparatus.
Figure 29:
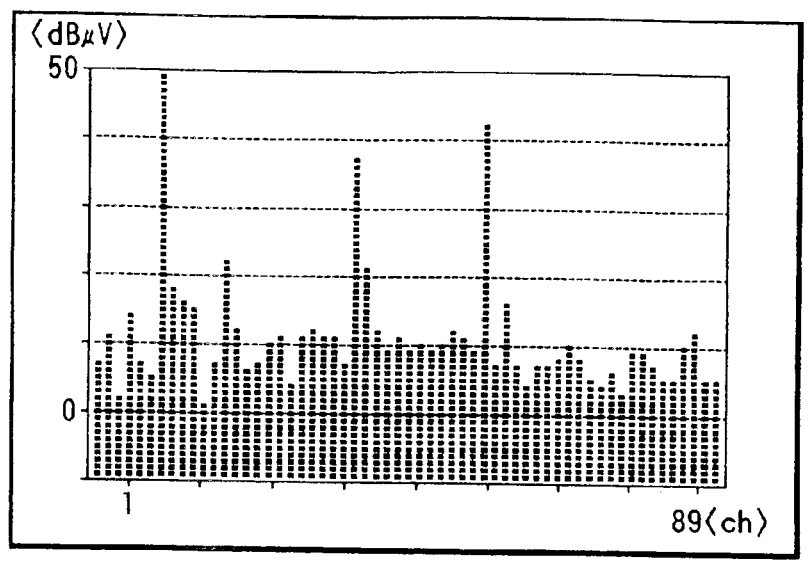
FIG. 29 is a diagram showing a display of a radio wave measuring instrument.
Figure 30A:
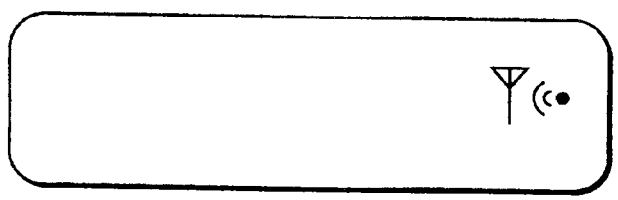
FIGS. 30A to 30C are diagrams showing display examples of an intensity of a radio wave that is received from the master.
Figure 30B:
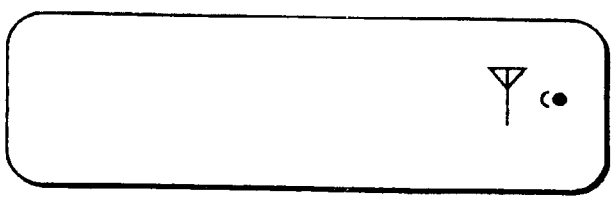
Figure 30C:
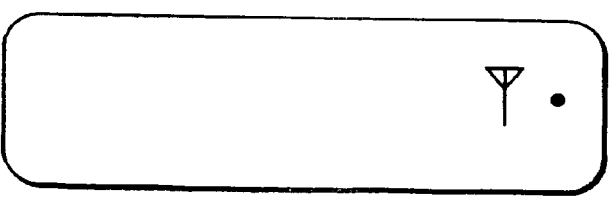

Referring to FIG. 28, when the user of the master 104*b* depresses the slave calling button 1104 in order to start the extension speech communication with the slave 105*b*, a radio link is established between the master 104*b* and slave 105*b*. The apparatus enters an in-speech state.

When the apparatus is set to the in-speech state, in the master 104*b*, the radio wave transmitted from the slave 105*b* is received by the radio I/F unit 110*b* and the intensity of the radio wave is detected.

In this speech state, when the slave radio wave intensity display button 1601 is depressed on the master 104*b* side, the control unit 106*b* of the master 104*b* instructs the radio I/F unit 110*b* to transmit the radio wave intensity notification start message M1001.

When the radio wave intensity notification start message M1001 is received by the slave 105*b*, on the slave 105*b* side, the transmission of the radio wave intensity notification message M501 from the radio I/F unit 117*d* is started.

The radio wave intensity notification message M501 transmitted from the slave 105*b* is received by the radio I/F unit 110b of the master 104b together with the radio wave transmitted from the slave 105b. The radio I/F unit 110b detects the intensity of the radio wave transmitted from the slave 105b. The radio wave intensity information indicative of the detected intensity of the radio wave is supplied to the control unit 106b together with the radio wave intensity notification message M501.

The control unit 106b controls so as to display a symbol indicative of the degree of the intensity of each radio wave by the display 1103 in accordance with the detected intensity of the radio wave from the slave 105b and the radio wave intensity notification message M501. The degree of the intensity of the radio wave from the master 104b and the degree of the intensity of the radio wave from the slave 105b are displayed on the display 1103.

After that, the radio wave intensity notification message M501 is notified from the slave 105b to the master 104b at every predetermined interval.

Subsequently, when the slave radio wave intensity display button 1601 is depressed on the master 104b side, the control unit 106b instructs the radio I/F unit 110b to transmit the radio wave intensity notification end message M1002.

When the radio wave intensity notification end message M1002 is received by the slave 105b, on the slave 105b side, the transmission of the radio wave intensity notification message M501 from the radio I/F unit 117d is stopped.

In the above sequence, although the radio wave intensity notification message M501 has been transmitted at a predetermined interval, it is also possible to set in a manner such that the radio wave intensity notification message M501 is transmitted when the intensity of the radio wave from the master 104b changes.

The display of the degree of the intensity of the radio wave from the master 104b and the degree of the intensity of the radio wave from the slave 105b by the display 1103 provided for the master 104b is executed in a manner similar to the case of FIGS. 26A to 26C and the description of such a display is omitted here.

As mentioned above, by the depressing operation of the slave radio wave intensity display button 1601 by the user of the master 104b, the presence or absence of the transmission of the radio wave intensity notification message M501 from the slave 105b is selected. Therefore, when the modem signal is used for the communication between the master 104b and the slave 105b, by selecting the absence of the transmission of the radio wave intensity notification message M501 from the slave 105b, it is possible to avoid that an unpleasant sound of the modem signal which is caused each time the radio wave intensity notification message M501 is transmitted is mixed into the speech communication sound during the speech communication. Namely, it is possible to prevent that the unpleasant sound of the modem signal which is caused by the transmission of the radio wave intensity notification message M501 is mixed during an important speech communication.

Although the invention has been described above on the basis of the embodiment, the present invention is not limited to the foregoing embodiments but many modifications and variations are possible within the spirit and scope of the appended claims of the invention.

What is claimed is:

1. A first communicating apparatus which is connected to a second radio communicating apparatus via a plurality of radio channels, comprising:
   transmitting means for transmitting a first request signal designating a first radio channel to the second radio communicating apparatus; and
   receiving means for receiving a first state signal indicative of a receiving state of the first radio channel at the second radio communicating apparatus from the second radio communicating apparatus in response to the first request signal,
   wherein said transmitting means transmits a second request signal designating a second radio channel to the second radio communicating apparatus in accordance with the reception of the first state signal, and
   said receiving means receives a second state signal indicative of a receiving state of a the second radio channel at the second radio communicating apparatus from the second radio communicating apparatus in response to the second request signal,
   further comprising display means for performing a display displaying the receiving states of the first and second radio channels according to the first and second stare signals received by said receiving means.

2. An apparatus according to claim 1, wherein said receiving means has connecting means for connecting said second radio communicating apparatus through a cable.

3. An apparatus according to claim 1, wherein said display means displays a judgment result about the presence or absence of the reception signal by said second radio communicating apparatus in accordance with said state signal.

4. An apparatus according to claim 1, wherein said display means displays a level of a signal received by said second radio communicating apparatus.

5. An apparatus according to claim 1, wherein said first radio communicating apparatus is connected to a telephone line through said second radio communicating apparatus.

6. An apparatus according to claim 1, wherein said display means displays states of a plurality of communication channels.

7. An apparatus according to claim 1, wherein said transmitting means re-transmits the first request signal after the reception of the second state signal.

8. An apparatus according to claim 1, wherein said transmitting means transmits the first and second request signals designating first and second radio channels included in one of a plurality of channel groups.

9. A method for controlling a first radio communicating apparatus connected to a second radio communicating apparatus via one of a plurality of radio channels, comprising the steps of:
   transmitting a first request signal designating a first radio channel to the second radio communicating apparatus;
   receiving from the second radio communicating apparatus a first state signal indicative of a receiving state of the first radio channel at the second radio communicating apparatus;
   transmitting a second request signal designating a second radio channel to the second radio communicating apparatus, in accordance with reception of the first state signal;
   receiving a second state signal indicative of a receiving state of the second radio channel at the second radio communicating apparatus, from the second radio communicating apparatus; and
   holding the receiving states of the first and second radio channels indicated by the first and second state signals.

10. A method according to claim 9, further comprising a step of displaying the receiving states of the first and second radio channels.

11. A method according to claim 9, wherein the first and second request signals are transmitted via a cable for connecting the first and second radio communicating apparatuses.

12. A method according to claim 9, wherein the first and second state signals are received via a cable for connecting the first and second radio communicating apparatuses.

13. A method according to claim 9, wherein the first radio communicating apparatus is connected to a telephone line through the second radio communicating apparatus.

14. A method according to claim 9, wherein the first request signal is re-transmitted after the reception of the second state signal.

15. A method according to claim 9, wherein the first and second request signals designating first and second radio channels included in one of a plurality of channel groups are transmitted in said transmitting step.

* * * * *